US012670668B2

(12) United States Patent
Kikuchi

(10) Patent No.: US 12,670,668 B2
(45) Date of Patent: Jun. 30, 2026

(54) INFORMATION PROCESSING APPARATUS, INFORMATION PROCESSING SYSTEM, AND INFORMATION PROCESSING METHOD

(71) Applicant: Hidetoshi Kikuchi, Tokyo (JP)

(72) Inventor: Hidetoshi Kikuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 104 days.

(21) Appl. No.: 18/065,734

(22) Filed: Dec. 14, 2022

(65) Prior Publication Data

US 2023/0206563 A1     Jun. 29, 2023

(30) Foreign Application Priority Data

Dec. 27, 2021     (JP) ................................. 2021-213218

(51) Int. Cl.
*G06T 19/00*        (2011.01)
*H04N 13/351*      (2018.01)

(52) U.S. Cl.
CPC ........... *G06T 19/00* (2013.01); *H04N 13/351* (2018.05)

(58) Field of Classification Search
None
See application file for complete search history.

(56) References Cited

U.S. PATENT DOCUMENTS 10,373,383 B1 * 8/2019 Werner ................... G06F 3/167
2002/0113809 A1   8/2002 Akazawa et al.

2007/0179867 A1 * 8/2007 Glazer ............... G06Q 30/0613
                                                                705/26.8
2009/0037291 A1 * 2/2009 Dawson ............. G06Q 30/0603
                                                                705/27.2
2009/0254842 A1   10/2009 Leacock et al.
2010/0333031 A1 * 12/2010 Castelli ................... G06F 16/95
                                                                715/848
2011/0231434 A1   9/2011 Tabata et al.
2014/0279540 A1 * 9/2014 Jackson ............... G06Q 20/381
                                                                705/44

(Continued)

FOREIGN PATENT DOCUMENTS

CN          110096155 A   *  8/2019
JP          2002-197376      7/2002

(Continued)

OTHER PUBLICATIONS

Office Action for JP2024-099802 mailed on Nov. 25, 2025.

*Primary Examiner* — Jwalant Amin
(74) *Attorney, Agent, or Firm* — IPUSA, PLLC

(57) ABSTRACT

An information processing apparatus is communicable with a user terminal operated by a user. The information processing apparatus includes circuitry. The circuitry transmits, to the user terminal, virtual space data according to which the user terminal displays a second virtual space to be called from a first virtual space. The circuitry acquires, according to an operation performed by the user on a particular object in the second virtual space, information for responding to the operation performed on the particular object from a cooperation apparatus associated with the particular object. The circuitry performs processing for responding to the operation performed on the particular object based on the information acquired from the cooperation apparatus.

16 Claims, 19 Drawing Sheets

(56) References Cited

U.S. PATENT DOCUMENTS

| | | | | |
|---|---|---|---|---|
| 2015/0066712 A1* | 3/2015 | Altieri | .................. | G06Q 10/087 |
| | | | | 705/28 |
| 2020/0053253 A1* | 2/2020 | Kavallierou | ....... | H04N 21/4622 |
| 2021/0004137 A1* | 1/2021 | Oser | .................. | G06Q 30/0601 |
| 2022/0321507 A1* | 10/2022 | Skuratowicz | ......... | G06F 3/0481 |

FOREIGN PATENT DOCUMENTS

| | | |
|---|---|---|
| JP | 2011-039731 | 2/2011 |
| JP | 2011-216073 | 10/2011 |
| JP | 2012-515398 | 7/2012 |
| JP | 2018-106697 | 7/2018 |
| JP | 2019-036258 | 3/2019 |
| JP | 2019-197427 | 11/2019 |
| JP | 2020-191573 | 11/2020 |
| KR | 10-2018-0017736 | 2/2018 |
| WO | WO2016/093063 A1 | 6/2016 |

* cited by examiner

USER INFORMATION

| USER | CONNECTION DESTINATION VIRTUAL SPACE | ··· |
|------|--------------------------------------|-----|
| UserA | VIRTUAL SPACE A | ··· |
| UserB | VIRTUAL SPACE B | ··· |
| ··· | ··· | ··· |

FIG. 5A

ASSOCIATION INFORMATION

| CONNECTION DESTINATION VIRTUAL SPACE | CORRESPONDING SECOND VIRTUAL SPACE | ··· |
|--------------------------------------|------------------------------------|-----|
| VIRTUAL SPACE A | VIRTUAL SPACE A′ | ··· |
| VIRTUAL SPACE B | – | |
| ··· | ··· | ··· |

FIG. 5B

ASSOCIATION INFORMATION

| FIRST VIRTUAL SPACE | CORRESPONDING SECOND VIRTUAL SPACE | CORRESPONDING THIRD VIRTUAL SPACE | ··· |
|---------------------|------------------------------------|-----------------------------------|-----|
| VIRTUAL SPACE A | VIRTUAL SPACE A′ | – | ··· |
| VIRTUAL SPACE B | – | VIRTUAL SPACE b | |
| ··· | ··· | ··· | ··· |

FIG. 8

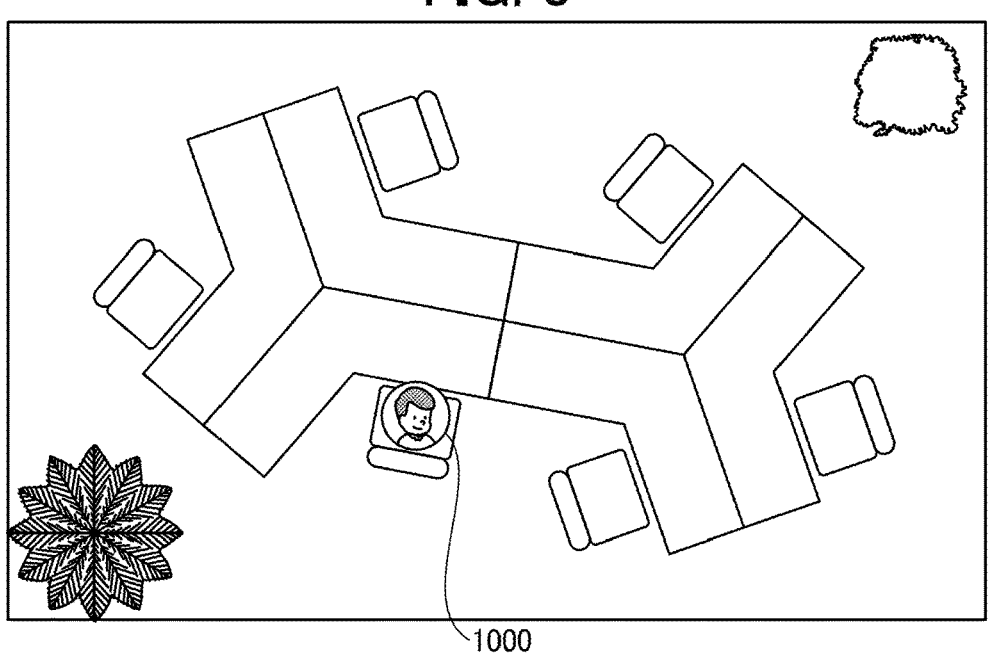

OBJECT INFORMATION

| CONNECTION DESTINATION VIRTUAL SPACE | ARRANGED OBJECT | EVENT TO BE EXECUTED WHEN OBJECT IS OPERATED | ⋯ |
|---|---|---|---|
| VIRTUAL SPACE A | A | NONE | ⋯ |
| | B | CALL SECOND VIRTUAL SPACE | ⋯ |
| | C | NONE | ⋯ |
| VIRTUAL SPACE B | X | NONE | ⋯ |
| ⋯ | ⋯ | ⋯ | ⋯ |

FIG. 10

COOPERATION DESTINATION INFORMATION

| SECOND VIRTUAL SPACE | OBJECT | COOPERATION DESTINATION INFORMATION | ⋯ |
|---|---|---|---|
| VIRTUAL SPACE A′ | AA | https://xxx | ⋯ |
| | AB | https//yyy | ⋯ |
| | AC | NONE | ⋯ |
| ⋯ | ⋯ | ⋯ | ⋯ |

FIG. 11

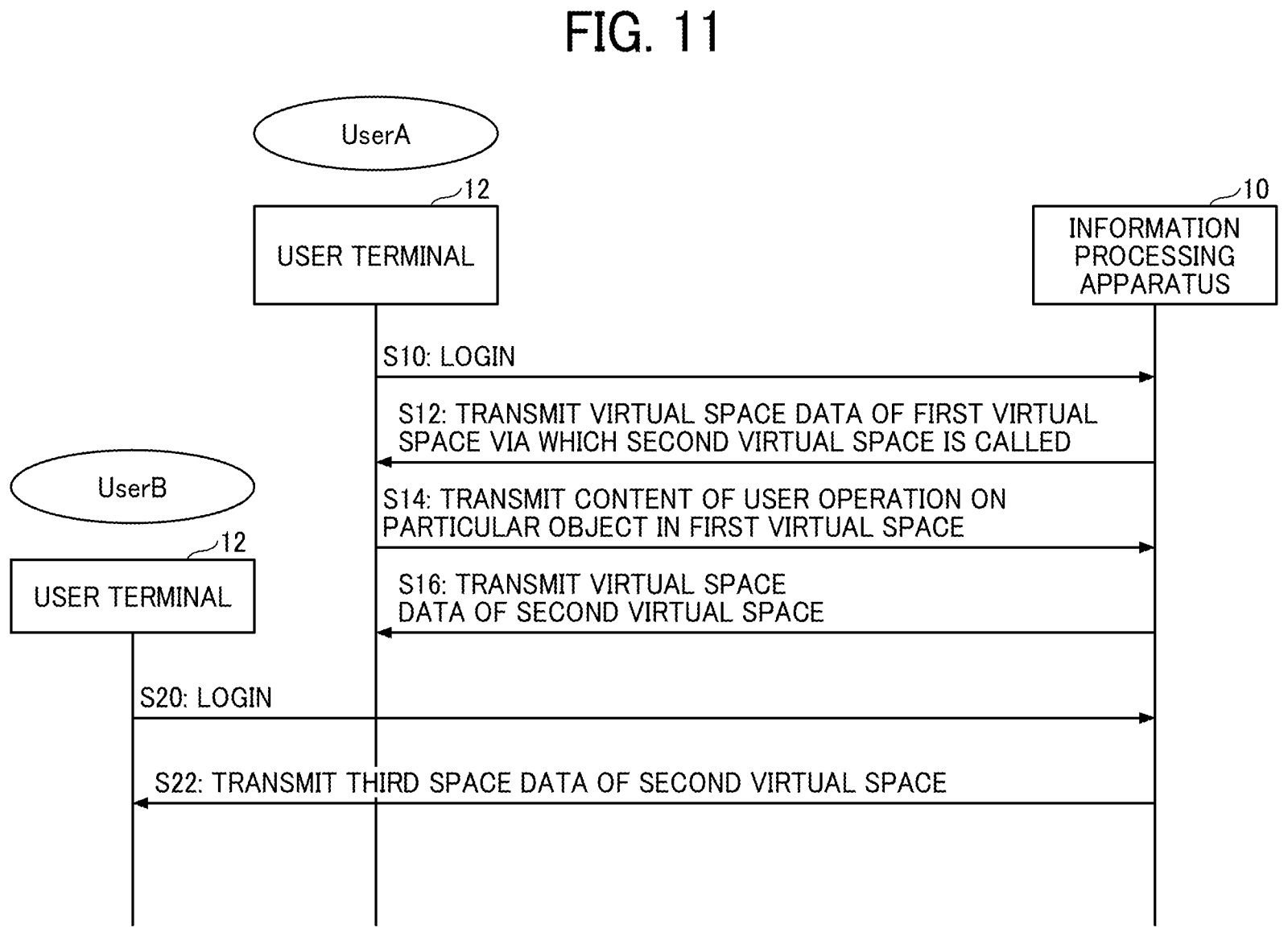

INFORMATION PROCESSING APPARATUS ~10

UserA

USER TERMINAL ~12

S10: LOGIN

S12: TRANSMIT VIRTUAL SPACE DATA OF FIRST VIRTUAL SPACE VIA WHICH SECOND VIRTUAL SPACE IS CALLED

S14: TRANSMIT CONTENT OF USER OPERATION ON PARTICULAR OBJECT IN FIRST VIRTUAL SPACE

S16: TRANSMIT VIRTUAL SPACE DATA OF SECOND VIRTUAL SPACE

UserB

USER TERMINAL ~12

S20: LOGIN

S22: TRANSMIT THIRD SPACE DATA OF SECOND VIRTUAL SPACE

USER INFORMATION

| USER | CONNECTION DESTINATION VIRTUAL SPACE | ATTRIBUTE INFORMATION | | | | |
|------|------|------|------|------|------|------|
| | | HEIGHT (cm) | GENDER | LINE-OF-SIGHT INFORMATION | PREFERENCE | ⋮ |
| UserA | VIRTUAL SPACE A | 180 | MALE | HIGH | – | ⋮ |
| UserB | VIRTUAL SPACE A | 145 | FEMALE | LOW | – | ⋮ |
| ⋮ | ⋮ | ⋮ | ⋮ | ⋮ | ⋮ | ⋮ |

FIG. 20

ASSOCIATION INFORMATION

| FIRST VIRTUAL SPACE | CORRESPONDING SECOND VIRTUAL SPACE | ⋮ |
|------|------|------|
| VIRTUAL SPACE A | VIRTUAL SPACE A′ | ⋮ |
| ⋮ | ⋮ | ⋮ |

USER INFORMATION

| USER | CONNECTION DESTINATION VIRTUAL SPACE | ATTRIBUTE INFORMATION | | | | |
|------|------|------|------|------|------|------|
| | | HEIGHT (cm) | GENDER | LINE-OF-SIGHT INFORMATION | AUTHORITY | |
| UserA | VIRTUAL SPACE A | 180 | MALE | HIGH | EMPLOYEE | ⋮ |
| UserB | VIRTUAL SPACE A | 145 | FEMALE | LOW | VISITOR | ⋮ |
| ⋮ | ⋮ | ⋮ | ⋮ | ⋮ | ⋮ | ⋮ |

FIG. 25

OBJECT INFORMATION

| FIRST VIRTUAL SPACE | ARRANGED OBJECT | EVENT TO BE EXECUTED WHEN OBJECT IS OPERATED | OBJECT OPERATION AUTHORITY | |
|------|------|------|------|------|
| VIRTUAL SPACE A | A | CALL SECOND VIRTUAL SPACE | FREE | ⋮ |
| | B | CALL SECOND VIRTUAL SPACE | FREE | ⋮ |
| | C | CALL SECOND VIRTUAL SPACE | FREE | ⋮ |
| | D | CALL SECOND VIRTUAL SPACE | EMPLOYEE | ⋮ |
| | ⋮ | ⋮ | ⋮ | ⋮ |

COOPERATION DESTINATION INFORMATION

| SECOND VIRTUAL SPACE | OBJECT | COOPERATION DESTINATION INFORMATION | OBJECT OPERATION AUTHORITY | ··· |
|---|---|---|---|---|
| VIRTUAL SPACE A′ | AA | https://xxx | ADMINISTRATOR | ··· |
| | AB | https://yyy | FREE | ··· |
| | AC | NONE | NONE | ··· |
| ··· | ··· | ··· | | ··· |

INFORMATION PROCESSING APPARATUS, INFORMATION PROCESSING SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2021-213218, filed on Dec. 27, 2021, in the Japan Patent Office, the entire disclosure of which is hereby incorporated by reference herein.

BACKGROUND

Technical Field

The present disclosure relates to an information processing apparatus, an information processing system, and an information processing method.

Related Art

Virtual spaces based on computer graphics technology are used in various fields.

In actual business, in face-to-face communication and non face-to-face communication such as remote work, one may sometimes share information that the one brings with him/her, other than documents shared in advance, for example, in business, meeting with a customer, and customer service.

SUMMARY

An embodiment of the present disclosure includes an information processing apparatus communicable with a user terminal operated by a user. The information processing apparatus includes circuitry. The circuitry transmits, to the user terminal, virtual space data according to which the user terminal displays a second virtual space to be called from a first virtual space. The circuitry acquires, according to an operation performed by the user on a particular object in the second virtual space, information for responding to the operation performed on the particular object from a cooperation apparatus associated with the particular object. The circuitry performs processing for responding to the operation performed on the particular object based on the information acquired from the cooperation apparatus.

An embodiment of the present disclosure includes an information processing system. The information processing system includes an information processing apparatus and a user terminal. The user terminal is operated by a user and communicable with the information processing apparatus. The information processing apparatus includes circuitry. The circuitry of the information processing apparatus transmits, to the user terminal, virtual space data according to which the user terminal displays a second virtual space to be called from a first virtual space. The circuitry of the information processing apparatus acquires, according to an operation performed by the user on a particular object in the second virtual space, information for responding to the operation performed on the particular object from a cooperation apparatus associated with the particular object. The circuitry of the information processing apparatus performs processing for responding to the operation performed on the particular object based on the information acquired from the cooperation apparatus. The user terminal includes circuitry.

The circuitry of the user terminal displays the second virtual space based on the virtual space data received from the information processing apparatus. The circuitry of the user terminal receives the operation performed by the user on the particular object in the second virtual space.

An embodiment of the present disclosure includes an information processing method performed by an information processing apparatus communicable with a user terminal operated by a user. The method includes transmitting, to the user terminal, virtual space data according to which the user terminal displays a second virtual space to be called from a first virtual space. The method includes acquiring, according to an operation performed by the user on a particular object in the second virtual space, information for responding to the operation performed on the particular object from a cooperation apparatus associated with the particular object. The method includes performing processing for responding to the operation performed on the particular object based on the information acquired from the cooperation apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a schematic diagram illustrating an example of a configuration of an information processing system, according to an embodiment of the present disclosure;

FIG. 4 is a table of an example of a data structure of user information, according to an embodiment of the present disclosure;

FIG. 5A and FIG. 5B are tables of examples of a data structure of association information, according to an embodiment of the present disclosure;

FIG. 8 is an illustration of an example of a third virtual space, according to an embodiment of the present disclosure;

FIG. 9 is a table of an example of a data structure of object information, according to an embodiment of the present disclosure;

FIG. 10 is a table of an example of a data structure of cooperation destination information, according to an embodiment of the present disclosure;

FIG. 11 is a sequence diagram illustrating an example of an operation of displaying a virtual space performed by the information processing system, according to an embodiment of the present disclosure;

FIG. 19 is a table of an example of a data structure of user information, according to an embodiment of the present disclosure;

FIG. 20 is a table of an example of a data structure of association information, according to an embodiment of the present disclosure;

FIG. 24 is a table of an example of a data structure of user information, according to an embodiment of the present disclosure;

FIG. 25 is a table of an example of a data structure of object information, according to an embodiment of the present disclosure;

Figure 2:
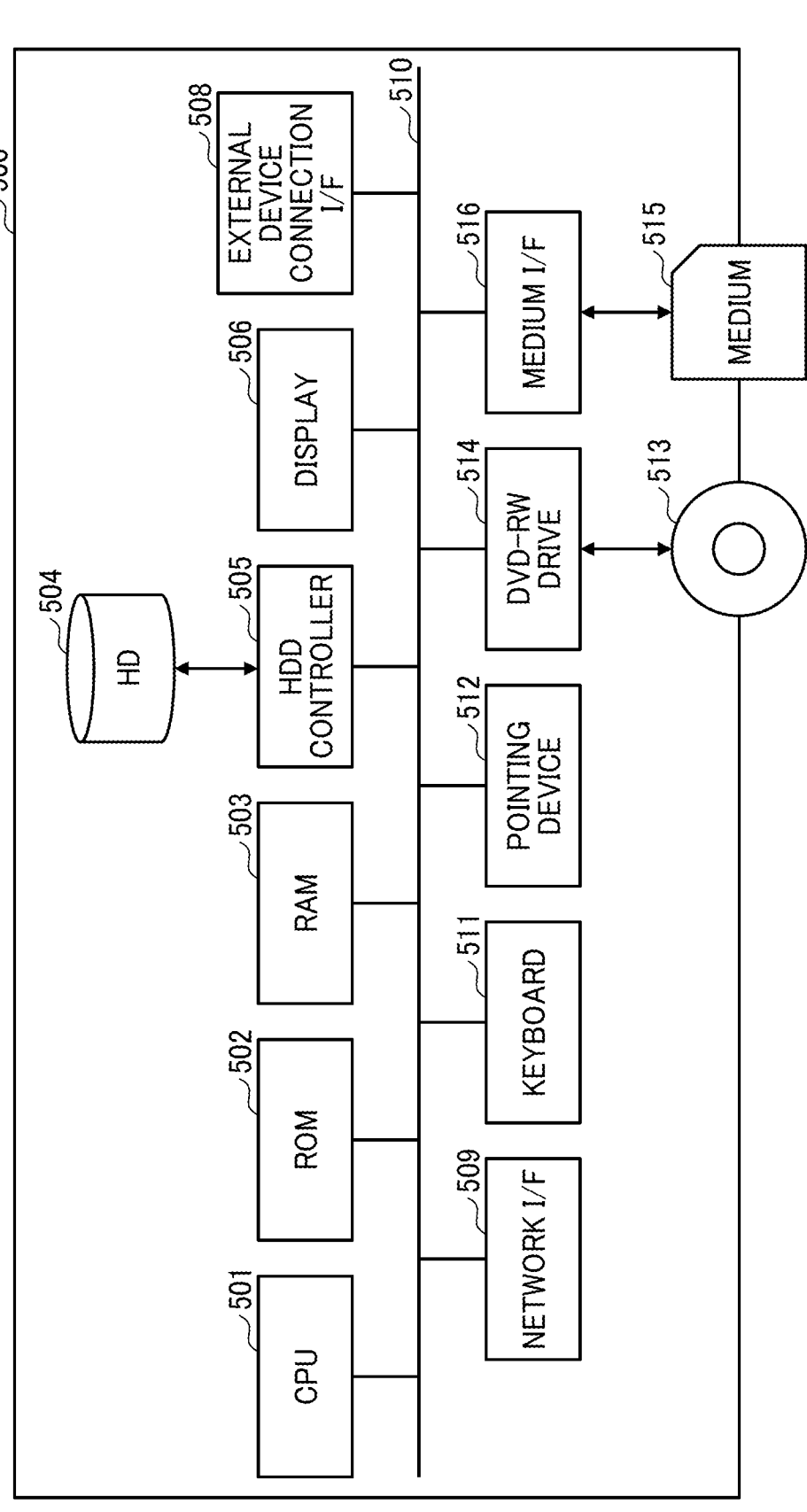
FIG. 2 is a block diagram illustrating an example of a hardware configuration of a computer, according to an embodiment of the present disclosure.

The accompanying drawings are intended to depict embodiments of the present disclosure and should not be interpreted to limit the scope thereof The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, embodiments of the present disclosure are described.

First Embodiment

System Configuration

Figure 1:
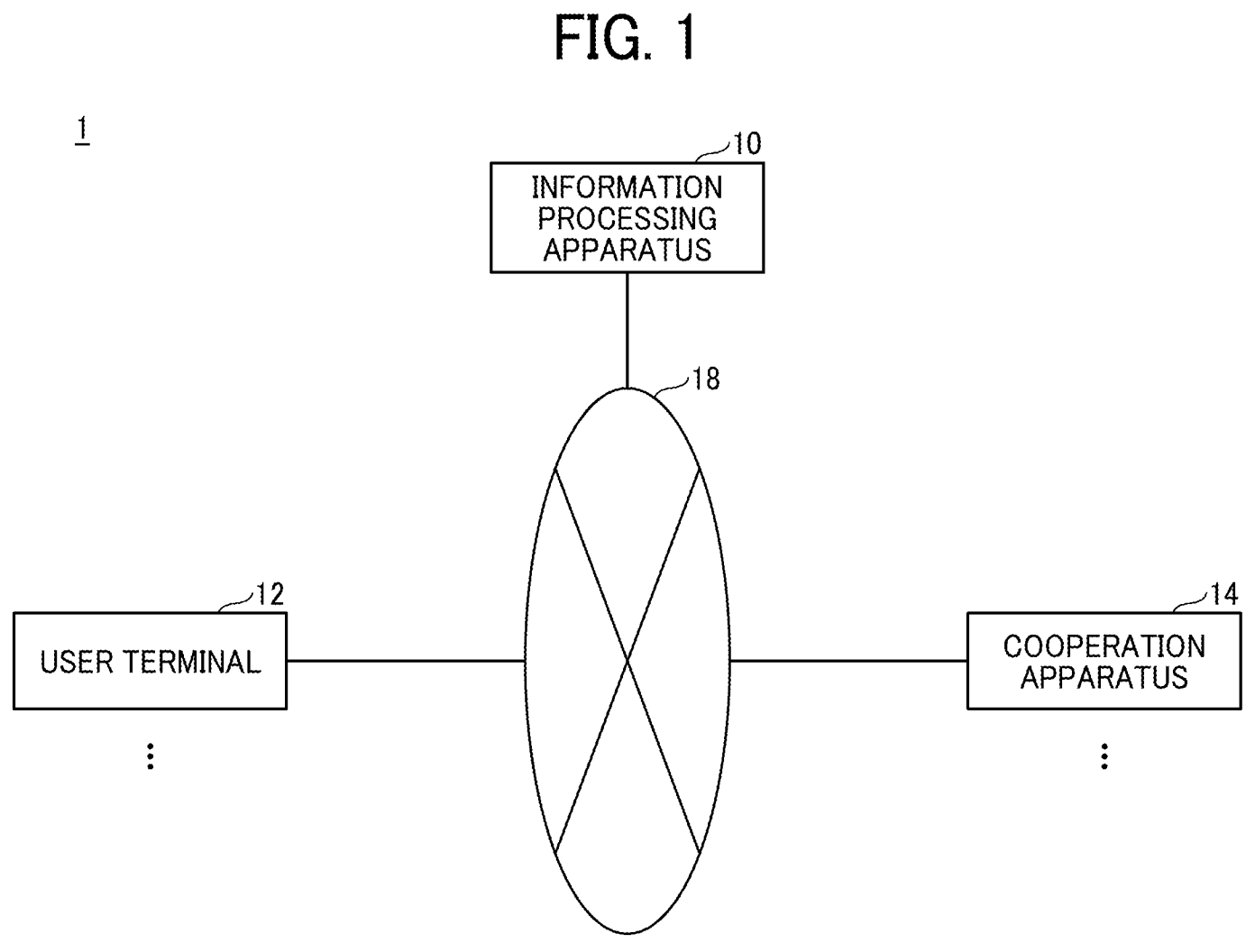

FIG. 1 is a schematic diagram illustrating an example of a configuration of an information processing system 1, according to the present embodiment. The information processing system 1 of FIG. 1 includes an information processing apparatus 10, one or more user terminals 12, and one or more cooperation apparatuses 14. The information processing system 1 performs communication through a network 18. The network 18 includes, for example, the Internet and a local area network (LAN).

The user terminal 12 is an information processing terminal operated by a user. The user differs depending on how the information processing system 1 is used. For example, when the information processing system 1 is used for a meeting by employees or the like, the user is an employee. For example, when the information processing system 1 is used for customer service in housing showrooms or the like, the user includes a sales person and a visitor. For example, when the information processing system 1 is used for tourism in art galleries, museums, or the like, the user is a guide person and a visitor. Examples of the user terminal 12 include, but are not limited to, a personal computer (PC), a mobile phone, a smartphone, a tablet terminal, a game console, and a personal digital assistant (PDA).

The information processing apparatus 10 performs processing for displaying virtual spaces such as a first virtual space, a second virtual space, and a third virtual space, which are described below, on the user terminal 12. The information processing apparatus 10 performs processes described below in cooperation with the cooperation apparatus 14 according to an operation received from the user in the virtual spaces. Examples of the information processing apparatus 10 include, but are not limited to, a PC and a workstation. Alternatively, the information processing apparatus 10 may be implemented by a server apparatus, an application service provider (ASP), or cloud computing.

The cooperation apparatus 14 performs processes described below in cooperation with the information processing apparatus 10. Examples of the cooperation apparatus 14 include, but are not limited, a PC, an online storage, a set top box, a multifunction peripheral/product/printer (MFP), a projector (PJ) and an interactive whiteboard (IWB). The IWB is a whiteboard having an electronic whiteboard function having mutual communication capability. The set top box is a device that delivers data for signage or projection mapping. The MFP is a multifunction peripheral having multiple functions such as a facsimile function, a printer function, a scanner function, and a copier function.

The configuration of the information processing system 1 illustrated in FIG. 1 is merely one example. In another example, at least a part of the functions of the information processing apparatus 10 may be provided in the user terminal 12 or the cooperation apparatus 14. In another example, at least a part of the functions of the user terminal 12 may be provided in the information processing apparatus 10 or the cooperation apparatus 14.

Hardware Configuration

Hardware Configuration of Computer

The information processing apparatus 10 of FIG. 1 is implemented by, for example, a computer 500 having a hardware configuration as illustrated in FIG. 2. In a case that the user terminal 12 and the cooperation apparatus 14 of FIG. 1 is a PC, each of the user terminal and the cooperation apparatus is implemented by the computer 500 having the hardware configuration as illustrated in FIG. 2. FIG. 2 is a block diagram illustrating an example of a hardware configuration of the computer 500, according to the present embodiment.

The computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

The CPU 501 controls overall operation of the computer 500 according to a program. The ROM 502 stores programs such as an initial program loader (IPL) to boot the CPU 501. The RAM 503 is used as a work area for the CPU 501. The HD 504 stores various data such as the program. The HDD controller 505 controls reading or writing of various data with respect to the HD 504 under control of the CPU 501.

The display 506 displays various information such as a cursor, a menu, a window, a character, or an image. The display 506 may be, for example, a head mounted display (HMD) or a head up display (HUD) device. The external device connection I/F 508 is an interface that connects the computer 500 to various external devices. Examples of the external devices include, but are not limited to, a universal serial bus (USB) memory.

The network I/F 509 is an interface for performing data communication using the network 18. Examples of the data bus 510 include, but are not limited to, an address bus and a data bus, which electrically connects the components, such as the CPU 501, with one another.

The keyboard 511 is an example of an input device provided with a plurality of keys that allows a user to input characters, numerals, or various instructions. The pointing device 512 is an example of an input device that allows a user to select or execute a specific instruction, select an item to be processed, or move a cursor being displayed. The DVD-RW drive 514 controls reading and writing of various data from and to a DVD-RW 513, which is an example of a removable storage medium. The DVD-RW is merely one example of the removable storage medium. In another example, a digital versatile disk recordable (DVD-R) may be used as the removable storage medium. The medium I/F 516 controls reading and writing (storing) of data from and to a storage medium 515 such as a flash memory.

The hardware configuration illustrated in FIG. 2 is merely one example, and the computer 500 may not include all of the components illustrated in FIG. 2, or may include any hardware components in addition to the components illustrated in FIG. 2. In a case that the user terminal 12 and the cooperation apparatus 14 in FIG. 1 are other than a PC, the user terminal and the cooperation apparatus can have various hardware configurations, and therefore illustrations thereof are omitted.

Functional Configuration

Figure 3:
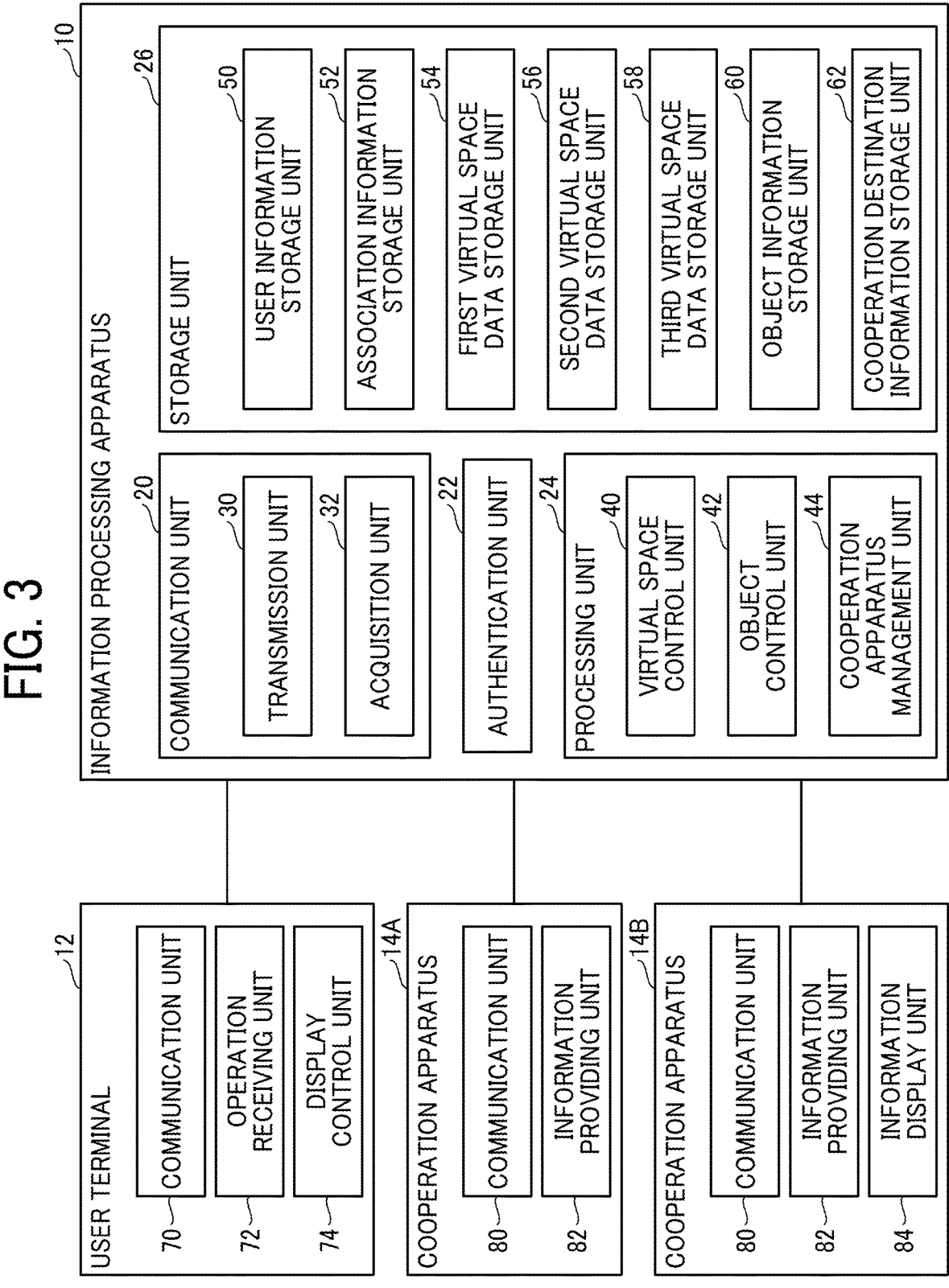
FIG. 3 is a block diagram illustrating an example of a functional configuration of the information processing system, according to an embodiment of the present disclosure.

The information processing system 1 according to the present embodiment is implemented, for example, by a functional configuration illustrated in FIG. 3. FIG. 3 is a block diagram illustrating a functional configuration of the information processing system 1, according to the present embodiment. In the description of the functional configuration illustrated in FIG. 3, descriptions of components unnecessary for the description of the present embodiment may be omitted. The information processing apparatus 10, the user terminal 12, a cooperation apparatus 14A, and a cooperation apparatus 14B implement the functional configuration of, for example, FIG. 3 by executing programs such as an operating system (OS) and an application. In the following description, the cooperation apparatus 14A and the cooperation apparatus 14B may be collectively referred to as the cooperation apparatus 14.

The user terminal 12 includes a communication unit 70, an operation receiving unit 72, and a display control unit 74. The communication unit 70 communicates with the information processing apparatus 10. The operation receiving unit 72 receives an operation from a user and performs various processing according to the received operation. The display control unit 74 displays virtual spaces such as the first virtual space, the second virtual space, and the third virtual space, which are described below, on the basis of virtual space data received from the information processing apparatus 10.

The cooperation apparatus 14A is associated with a particular object in the second virtual space described below, and provides the information processing apparatus 10 with information as described below according to a user's operation on the associated particular object. The cooperation apparatus 14A may be any suitable apparatus or device, provided that it can provide the information processing apparatus 10 with information as described below. Examples of the cooperation apparatus 14A include, but are not limited to, an online storage, a set top box and a camera. The set top box is an example of a content management apparatus. The cooperation apparatus 14A may be a cloud storage.

The cooperation apparatus 14A includes a communication unit 80 and an information providing unit 82. The communication unit 80 communicates with the information processing apparatus 10. The information providing unit 82 provides the information processing apparatus 10 with information as described below.

In the same or substantially the same manner as the cooperation apparatus 14A, the cooperation apparatus 14B is associated with a particular object in the second virtual space described below, and provides the information processing apparatus 10 with information as described below according to a user's operation on the associated particular object. The cooperation apparatus 14B is an example of an apparatus provided in the real space and having a function similar to a function of the associated particular object. The cooperation apparatus 14B performs various processing such as display output or sound outputting in synchronization with the particular object in the second virtual space. Examples of the cooperation apparatus 14B include, but are not limited to, an IWB, a PJ, and a PC. The cooperation apparatus 14B is an example of a device in the real space.

The cooperation apparatus 14B includes the communication unit 80, the information providing unit 82, and an information display unit 84. The communication unit 80 communicates with the information processing apparatus 10. The information providing unit 82 provides the information processing apparatus 10 with information as described below. The information display unit 84 performs display output or sound output in synchronization with the particular object in the second virtual space.

The information processing apparatus 10 includes a communication unit 20, an authentication unit 22, a processing unit 24, and a storage unit 26. The communication unit 20 includes a transmission unit 30 and an acquisition unit 32. The processing unit 24 includes a virtual space control unit 40, an object control unit 42, and a cooperation apparatus management unit 44. The storage unit 26 includes a user information storage unit 50, an association information storage unit 52, a first virtual space data storage unit 54, a second virtual space data storage unit 56, a third virtual space data storage unit 58, an object information storage unit 60, and a cooperation destination information storage unit 62.

The communication unit 20 controls communication with the user terminal 12, the cooperation apparatus 14A, and the cooperation apparatus 14B. The transmission unit 30 of the communication unit 20 transmits information or data to the user terminal 12, the cooperation apparatus 14A, and the cooperation apparatus 14B. For example, the transmission unit 30 transmits virtual space data for displaying a virtual space to the user terminal 12.

The acquisition unit 32 receives information or data from the user terminal 12, the cooperation apparatus 14A, and the cooperation apparatus 14B. For example, the acquisition unit 32 receives, from the user terminal 12, content of an operation performed by the user on the particular object in the first virtual space and the second virtual space described below. Further, the acquisition unit 32 receives information for responding to the operation by the user from the cooperation apparatus 14A and the cooperation apparatus 14B associated with the particular object in the second virtual space.

The authentication unit 22 receives a login request from the user terminal 12 and performs authentication processing. The processing unit 24 performs various processing relating to virtual spaces such as the first virtual space, the second virtual space, and the third virtual space, which are described below. The virtual space control unit 40 controls virtual spaces such as the first virtual space, the second virtual space, and the third virtual space, which are described below, to displayed on the user terminal 12.

The object control unit 42 controls an object in a virtual space such as the first virtual space and the second virtual space, which are described below. The cooperation apparatus management unit 44 manages the particular object in a virtual space such as the second virtual space described below and the cooperation apparatus 14A or the cooperation apparatus 14B in association with each other.

The user information storage unit 50 of the storage unit 26 stores user information illustrated in FIG. 4, for example. FIG. 4 is a table of an example of a data structure of the user information. The user information of FIG. 4 includes items of user and connection destination virtual space. The item "user" is an example of identification information identifying a user who operates the user terminal 12. The item "user" includes an account of the user, an account of a company or the like to which the user belongs, and an email address of the user. The item "connection destination virtual space" is an example of identification information of a virtual space associated with the user identified by the item "user." The information processing apparatus 10 can specify a virtual space corresponding to the user on the basis of the user information of FIG. 4 and cause the user terminal 12 to display the virtual space.

The association information storage unit 52 stores association information illustrated in FIG. 5A and FIG. 5B, for example. FIG. 5A and FIG. 5B are tables of examples of a data structure of the association information. The association information of FIG. 5A includes items of a connection destination virtual space and a corresponding second virtual space. The item "connection destination virtual space" is an example of identification information of the first virtual space or the third virtual space associated with a user of the user terminal 12. The item "corresponding second virtual space" is an example of identification information of the second virtual space that can be called from a virtual space identified by the item "connection destination virtual space." In the example of FIG. 5A, no second virtual space is set in the item "corresponding second virtual space" associated with the connection destination virtual space "virtual space B". This means that there is no second virtual space that can be called (transitioned) from the connection destination virtual space "virtual space B." In this case, the connection destination virtual space "virtual space B" is the third virtual space described below.

The association information of FIG. 5B includes the items of the first virtual space, a corresponding second virtual space, and a corresponding third virtual space. The item "first virtual space" is an example of identification information identifying the first virtual space displayed on the user terminal 12. The item "corresponding second virtual space" is an example of identification information identifying the second virtual space that can be called from the virtual space identified by the item "first virtual space." The item "corresponding third virtual space" is an example of identification information identifying the third virtual space that can be called from the virtual space identified by the item "first virtual space."

For example, in the example of FIG. 5B, "virtual space A'" is set in the item "corresponding second virtual space" associated with the first virtual space "virtual space A", and the third virtual space is not set in the item "corresponding third virtual space." Thus, the virtual space that can be called from the first virtual space "virtual space A" is the second virtual space.

For example, in the example of FIG. 5B, no second virtual space is not set in the item "corresponding second virtual space" associated with the first virtual space "virtual space B", and "virtual space b" is set in the item "corresponding third virtual space." Thus, the virtual space that can be called from the first virtual space "virtual space B" is the third virtual space.

Figure 6:
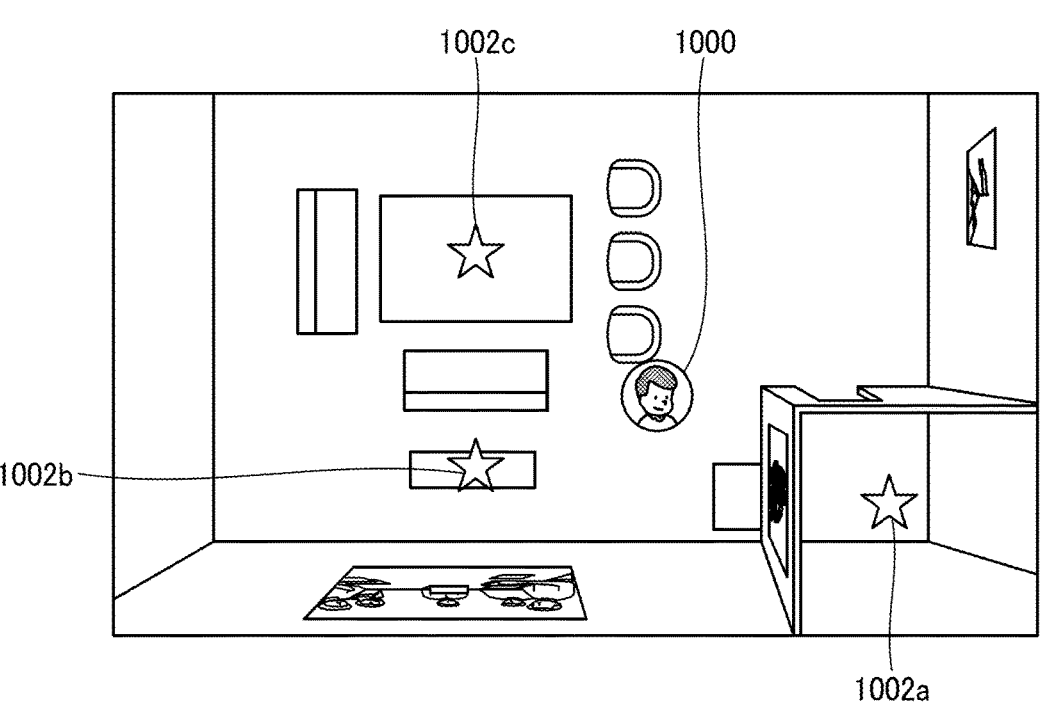
FIG. 6 is an illustration of an example of a first virtual space, according to an embodiment of the present disclosure.

FIG. 6 is an illustration of an example of the first virtual space. FIG. 6 is an example of the first virtual space expressed in two dimensions. The first virtual space may be expressed in three dimensions. In the first virtual space of FIG. 6, an icon 1000 of a logged-in user logging in from the user terminal 12 is displayed. The logged-in user can move the icon 1000 by operating the user terminal 12. For example, when multiple users are logging in, the information processing apparatus 10 may provide a chat function or the like to the users whose icons 1000 overlap.

The first virtual space is provided with an entrance to the second virtual space for the logged-in user. In other words, the first virtual space includes a mechanism for calling the second virtual space. The entrance to the second virtual space is represented by, for example, an icon, an area, a figure and/or a mark. For example, in the first virtual space of FIG. 6, multiple objects including an object 1002*a* to an object 1002*c* each representing an example of the entrance to the second virtual space are displayed. The user operates the user terminal 12 to, for example, move the icon 1000 representing the user himself or herself close to the entrance to the second virtual space or to move the icon 1000 to cause the icon to overlap with the entrance to the second virtual space, to control the user terminal to display the second virtual space.

Figure 7:
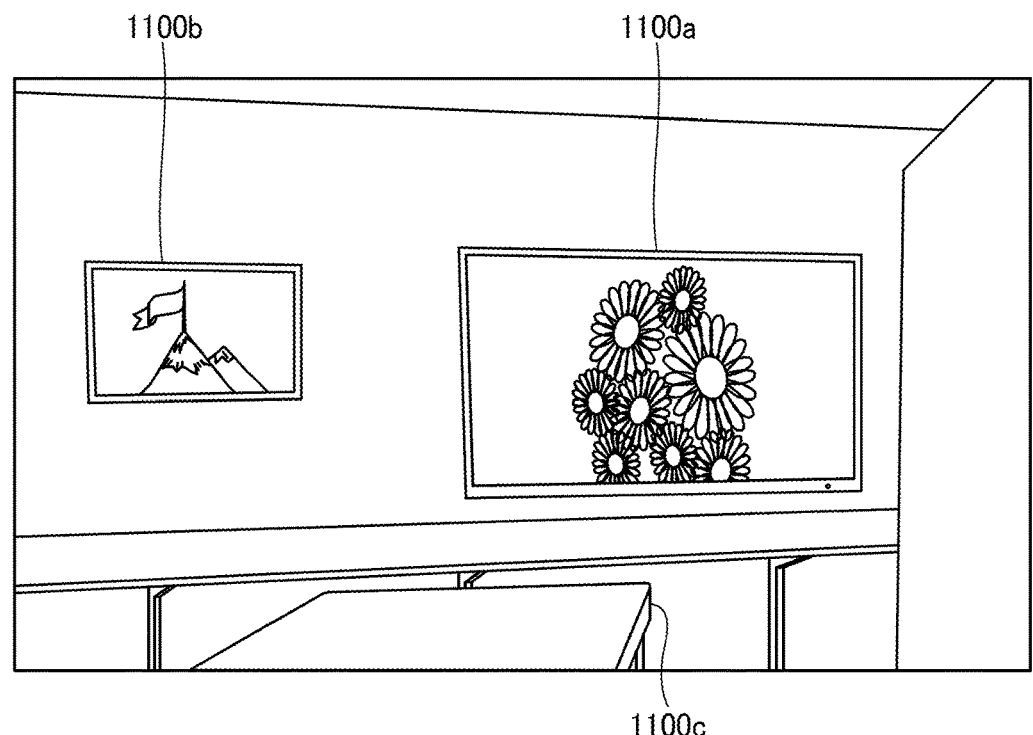
FIG. 7 is an illustration of an example of a second virtual space, according to an embodiment of the present disclosure.

FIG. 7 is an illustration of an example of the second virtual space. The second virtual space of FIG. 7 is a 360-degree moving image or a 360-degree still image expressed in three dimensions. The second virtual space expresses, for example, at least a part of the first virtual space in three dimensions. In the second virtual space of FIG. 7, one or more objects 1100*a* to 1100*c* are displayed. In the present embodiment, a description is provided on the assumption that the one or more objects 1100*a* to 1100*c* include a particular object 1100*a* associated with the cooperation apparatus 14.

For example, the particular object 1100*a* associated with the cooperation apparatus 14 receives an operation from a user (or an avatar representing the user) in the second virtual space, and causes information acquired from the associated cooperation apparatus 14 to be displayed on the particular object 1100*a*. The cooperation apparatus 14 may have a configuration of acquiring information from a cloud or the like and using the acquired information in the real space. Alternatively, the cooperation apparatus 14 may have a configuration of using information stored in the cooperation apparatus 14 itself For example, the particular object 1100*a* may synchronously display and output an image being displayed by the cooperation apparatus 14 associated with the particular object 1100*a*. The image being displayed by the cooperation apparatus 14 includes, for example, a list of files in the online storage, an image of an opened file, an image on the signage, and an image of the projection mapping. Further, the cooperation apparatus 14 associated with the particular object 1100*a* may display and output the image displayed by the particular object 1100*a*.

FIG. 8 is an illustration of an example of the third virtual space. FIG. 8 is an example of the third virtual space expressed in two dimensions. The third virtual space may be displayed in three dimensions. In the third virtual space of FIG. 8, the icon 1000 representing a logged-in user logging in from the user terminal 12 is displayed. The logged-in user can move the icon 1000 by operating the user terminal 12. For example, when multiple users are logging in, the information processing apparatus 10 may provide a chat function to the users whose icons 1000 overlap. The third virtual space of FIG. 8 include no particular object 1100*a* associated with the cooperation apparatus 14 unlike in the second virtual space illustrated in FIG. 7.

FIG. 9 is a table of an example of a data structure of object information. The object information in FIG. 9 includes items of connection destination virtual space, arranged object, and event to be executed when object is operated. The item "connection destination virtual space" is an example of identification information identifying the connection destination virtual space. The item "arranged object" is an example of identification information identifying an object arranged in the virtual space identified by the item "connection destination virtual space." For example, in the example of FIG. 6, the "arranged object" is the identification information of the object 1002*a* to the object 1002*c*. In the item "event to be executed when object is operated," an event to be executed when an operation by the user with respect to the object identified by the item "arranged object" in the first virtual space is received is set.

For example, in a case that the event to be executed when the object is operated is "call second virtual space," the user operates the object identified by the item "arranged object" to call the second virtual space. In a case that the object 1002*a* in FIG. 6 is the arranged object B illustrated in FIG. 9, the information processing apparatus 10 executes an event of calling the second virtual space according to the user's operation of moving the icon 1000 representing the user himself or herself close to the object 1002*a* or causing the icon 1000 to overlap with the object 1002*a*.

FIG. 10 is a table of an example of a data structure of cooperation destination information. The cooperation destination information of FIG. 10 includes items of second virtual space, object, and cooperation destination information. The item "second virtual space" is an example of identification information identifying the second virtual space. The item "object" is an example of identification information identifying an object arranged in the virtual space identified by the item "second virtual space." The item "cooperation destination information" is an example of identification information identifying the cooperation apparatus 14 associated with the object identified by the item "object" in the second virtual space. The identification information of the cooperation apparatus 14 may be a link to the cooperation apparatus 14 in the real space or a link to an application or the like executed by the cooperation apparatus 14. Alternatively, the identification information of the cooperation apparatus 14 may be an application programming interface (API) that calls the cooperation apparatus 14 or the application, for example. An object in the second virtual space for which no information is set in the item "cooperation destination information" is not associated with the cooperation apparatus 14 in the real space.

Operation

An operation performed by the information processing system 1 is described, according to the present embodiment. FIG. 11 is a sequence diagram illustrating an example of an operation of displaying a virtual space by the information processing system 1, according to the present embodiment. In the following, a description is provided of an example in which the association information of in FIG. 5A is applied.

In step S10, the user terminal 12 receives a login operation from a user "UserA." The communication unit 70 of the user terminal 12 transmits a login request of the user "UserA" to the information processing apparatus 10. The authentication unit 22 of the information processing apparatus 10 performs authentication processing of the user "UserA." When the authentication is successful, the virtual space control unit 40 of the processing unit 24 identifies a connection destination virtual space "virtual space A" associated with the user "UserA" on the basis of the user information of FIG. 4. In step S12, the transmission unit 30 of the information processing apparatus 10 transmits virtual space data of the virtual space "virtual space A", which is an example of the first virtual space from which the second virtual space can be called, to the user terminal 12 operated by the user "UserA."

The display control unit 74 of the user terminal 12 of the user "UserA" that receives the virtual space data of the virtual space "virtual space A" displays the first virtual space as illustrated in FIG. 6. The user "UserA" operates the user terminal 12 to moves the icon 1000 close to, for example, the particular object 1002a in the first virtual space corresponding to the arranged object B of the object information in FIG. 9.

In step S14, the communication unit 70 of the user terminal 12 transmits content of the operation performed by the user "UserA" on the particular object 1002a in the first virtual space to the information processing apparatus 10. The acquisition unit 32 of the information processing apparatus 10 receives the content of the operation performed by the user "UserA" on the particular object 1002a in the first virtual space.

The object control unit 42 of the processing unit 24 determines that the particular object 1002a in the first virtual space is an object that calls the second virtual space on the basis of the object information in FIG. 9. The virtual space control unit 40 of the processing unit 24 identifies the second virtual space "virtual space A'" corresponding to the connection destination virtual space "virtual space A" of the user "UserA" on the basis of the association information of FIG. 5A. In step S16, the transmission unit 30 of the information processing apparatus 10 transmits virtual space data of the identified second virtual space "virtual space A'" to the user terminals 12 of the user "UserA." The display control unit 74 of the user terminal 12 of the user "UserA" displays the received virtual space data of the second virtual space "virtual space A'", for example, as illustrated in FIG. 7.

In step S20, the user terminal 12 receives a login operation from a user "UserB." The communication unit 70 of the user terminal 12 transmits a login request of the user "UserB" to the information processing apparatus 10. The authentication unit 22 of the information processing apparatus 10 performs authentication processing of the user "UserB." When the authentication is successful, the virtual space control unit 40 of the processing unit 24 identifies a connection destination virtual space "virtual space B" associated with the user "UserB" on the basis of the user information of FIG. 4. The virtual space B is the third virtual space. In step S22, the transmission unit 30 of the information processing apparatus 10 transmits virtual space data of the virtual space "virtual space B", which is an example of the third virtual space from which the second virtual space cannot be called, to the user terminal 12 operated by the user "UserB."

The display control unit 74 of the user terminal 12 of the user "UserB" that receives the virtual space data of the virtual space "virtual space B" displays the third virtual space as illustrated in FIG. 8. Thus, even when the user "UserB" logs in in substantially the same manner as the user "UserA," the user terminal 12 operated by the user "UserB" cannot display the first virtual space from which the second virtual space can be called, and therefore the second virtual space cannot be called.

Figure 12:
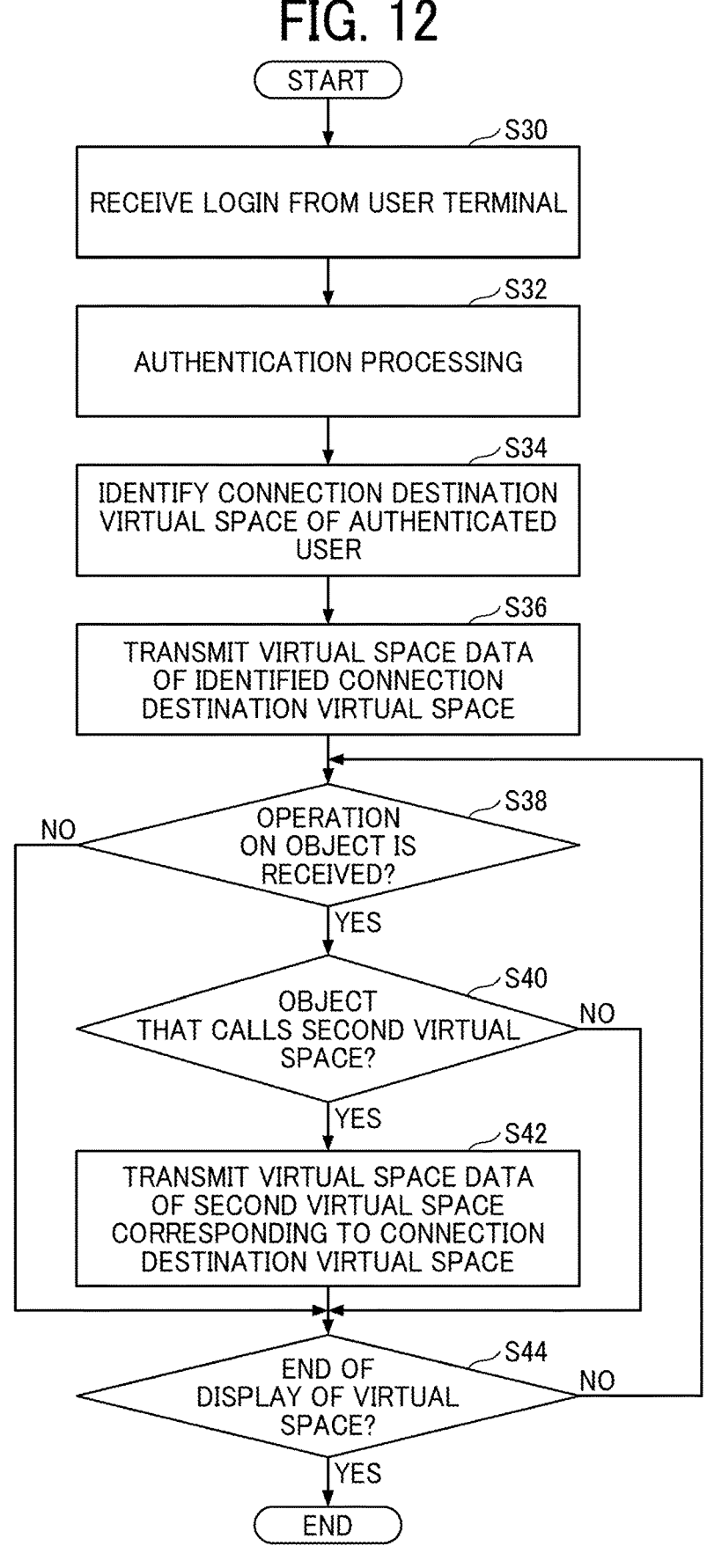
FIG. 12 is a flowchart illustrating an example of an operation of displaying a virtual space performed by an information processing apparatus, according to an embodiment of the present disclosure.

FIG. 12 is a flowchart illustrating an example of an operation of displaying a virtual space performed by the information processing apparatus 10, according to the present embodiment.

In step S30, the acquisition unit 32 of the information processing apparatus 10 receives a login request according to a user operation from the user terminal 12. In step S32, the authentication unit 22 performs authentication processing of authenticating the user operating the user terminal 12 from which the login request is received. When the authentication is successful, in step S34, the virtual space control unit 40 of the processing unit 24 identifies the connection destination virtual space of the authenticated user on the basis of the user information of FIG. 4.

In step S36, the transmission unit 30 of the information processing apparatus 10 transmits virtual space data of the identified connection destination virtual space to the user terminal 12 of the user for who is successfully authenticated. In step S38, the object control unit 42 determines whether content of the operation on an object in the connection destination virtual space is received from the user terminal 12.

When the determination result indicates that the content of the operation on the object in the connection destination virtual space is received from the user terminal 12, the object control unit 42 performs a process of step S40. In step S40, the object control unit 42 determines whether the object that receives the operation from the user is an object that calls the second virtual space on the basis of the object information of FIG. 9.

When the determination result indicates that the object is an object that calls the second virtual space, the virtual space control unit 40 performs a process of step S42. In step S42, the virtual space control unit 40 identifies the second virtual space corresponding to the connection destination virtual space of the user on the basis of the association information of FIG. 5A. The transmission unit 30 of the information processing apparatus 10 transmits virtual space data of the identified second virtual space to the user terminal 12 of the users. Then, the operation proceeds to a process of step S44.

When the determination result in step S38 indicates that the content of the operation on the object in the connection destination virtual space is not received from the user terminal 12, and when the determination result in step S40 indicates that the object on which the operation is received is not the object that calls the second virtual space, the virtual space control unit 40 proceeds to a process of step S44.

In step S44, the virtual space control unit 40 determines whether content of an operation for ending display of the virtual space is received from the user terminal 12. The information processing apparatus 10 repeats the processes of steps S38 to S44 until the content of the operation for ending the display of the virtual space is received from the user terminal 12.

With the operation of the flowchart of FIG. 12, when an operation on an object that calls the second virtual space is received from the user, the second virtual space of, for example, FIG. 7 is displayed on the user terminal 12. Further, with the operation of the flowchart of FIG. 12, when an operation on an object other than the object that calls the second virtual space is received from the user, the first virtual space of, for example, FIG. 6 is kept displayed on the user terminal 12.

Figure 13:
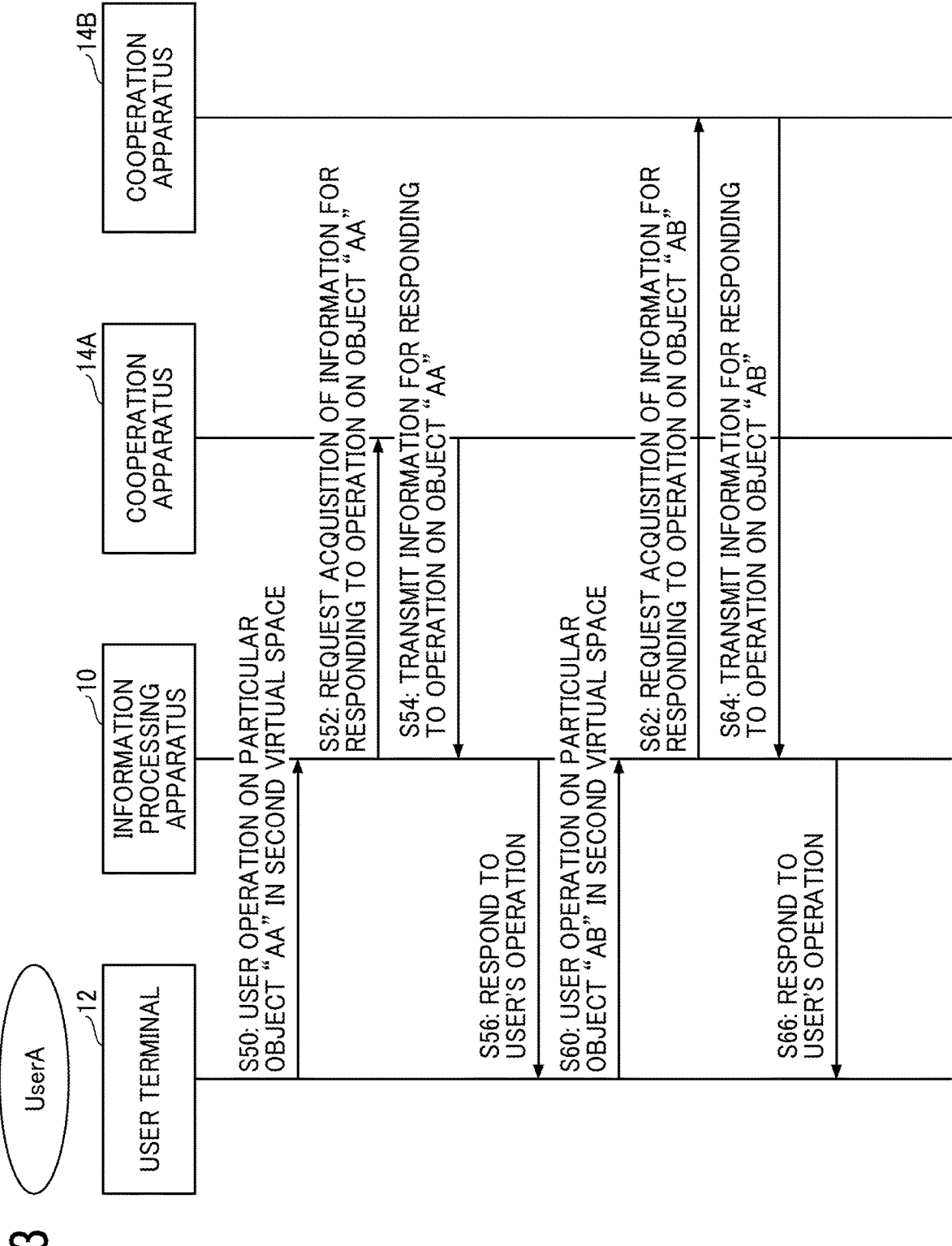
FIG. 13 is a sequence diagram illustrating an example of an operation performed by the information processing system when an operation on an object in the second virtual space is received, according to an embodiment of the present disclosure.

FIG. 13 is a sequence diagram illustrating an example of an operation performed by the information processing system 1 when an operation on an object in the second virtual space is received, according to the present embodiment. In the present embodiment, an example is described in which a user who operates the user terminal 12 is the "UserA." Further, in the present embodiment, the second virtual space is "virtual space A'."

In step S50, the user terminal 12 receives an operation on a particular object "AA" in the second virtual space. The communication unit 70 of the user terminal 12 transmits content of the operation performed by the user on the particular object "AA" in the second virtual space to the information processing apparatus 10. The acquisition unit 32 of the information processing apparatus 10 receives the content of the operation performed by the user on the particular object "AA" in the second virtual space.

In step S52, the cooperation apparatus management unit 44 of the processing unit 24 identifies cooperation destination information associated with the particular object "AA" in the second virtual space on which the operation is received on the basis of the cooperation destination information of FIG. 10. For example, in the case of the cooperation destination information of FIG. 10, the cooperation apparatus management unit 44 identifies "https://xxx" as the cooperation destination information associated with the object "AA." The cooperation apparatus management unit 44 requests the cooperation apparatus 14A corresponding the identified cooperation destination information to acquire information for responding to the user's operation on the object "AA."

In step S54, the cooperation apparatus 14A transmits the requested information to the information processing apparatus 10. The acquisition unit 32 of the information processing apparatus 10 receives the information for responding to the user's operation on the object "AA."

In step S56, the virtual space control unit 40 of the information processing apparatus 10 performs a process of responding to the user's operation on the object "AA" on the basis of the information received from the cooperation apparatus 14A.

For example, in a case that the user's operation on the object "AA" is an operation of displaying a file stored in the cooperation apparatus 14A, the virtual space control unit 40 performs a process of controlling the object "AA" in the second virtual space to display information of the file stored in the cooperation apparatus 14A.

As described above, a user who operates the user terminal 12 operates the particular object "AA" in the second virtual space, to cause the particular object "AA" in the second virtual space to display the information of the file stored in the cooperation apparatus 14A associated with the object "AA."

In step S60, the user terminal 12 receives an operation on a particular object "AB" in the second virtual space. The communication unit 70 of the user terminal 12 transmits content of the operation performed by the user on the particular object "AB" in the second virtual space to the information processing apparatus 10. The acquisition unit 32 of the information processing apparatus 10 receives the content of the operation performed by the user on the particular object "AB" in the second virtual space.

In step S62, the cooperation apparatus management unit 44 of the processing unit 24 identifies cooperation destination information associated with the particular object "AB" in the second virtual space on which the operation is received on the basis of the cooperation destination information of FIG. 10. For example, in the case of the cooperation destination information of FIG. 10, the cooperation apparatus management unit 44 identifies "https://yyy" as the cooperation destination information associated with the object "AB." The cooperation apparatus management unit 44 requests the cooperation apparatus 14B corresponding the identified cooperation destination information to acquire information for responding to the user's operation on the object "AB."

In step S64, the cooperation apparatus 14B transmits the requested information to the information processing apparatus 10. The acquisition unit 32 of the information processing apparatus 10 receives the information for responding to the user's operation on the object "AB."

In step S66, the virtual space control unit 40 of the information processing apparatus 10 performs a process of responding to the user's operation on the object "AB" on the basis of the information received from the cooperation apparatus 14B.

For example, in a case that the user's operation on the object "AB" is an operation for displaying data for the signage or the projection mapping of the cooperation apparatus 14B, the virtual space control unit 40 performs a process of controlling the object "AB" in the second virtual space to display the data for the signage or the projection mapping of the cooperation apparatus 14B. As described above, a user who operates the user terminal 12 operates the particular object "AB" in the second virtual space, to cause the particular object "AB" in the second virtual space to display the data for the signage or the projection mapping of the cooperation apparatus 14B associated with the object "AB."

Figure 14:
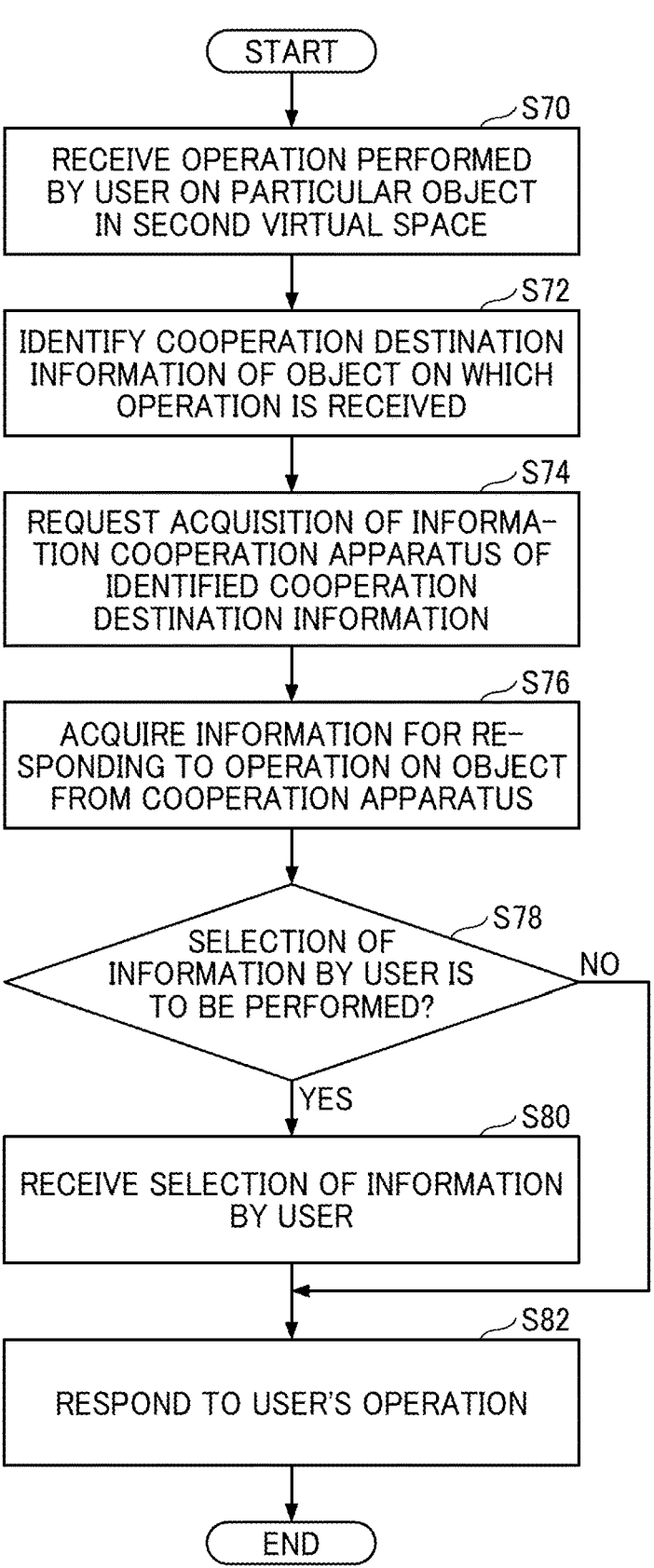
FIG. 14 is a flowchart illustrating an example of an operation performed by the information processing apparatus when an operation on an object in the second virtual space is received, according to an embodiment of the present disclosure.

FIG. 14 is a flowchart illustrating an example of an operation performed by the information processing apparatus 10 when an operation on an object in the second virtual space is received, according to the present embodiment.

In step S70, the acquisition unit 32 of the information processing apparatus 10 receives content of an operation performed by a user on a particular object in the second virtual space. In step S72, the cooperation apparatus management unit 44 of the processing unit 24 identifies cooperation destination information associated with the particular object in the second virtual space on which the operation is received on the basis of the cooperation destination information of, for example, FIG. 10.

In step S74, the cooperation apparatus management unit 44 requests the cooperation apparatus 14 corresponding the identified cooperation destination information to acquire information for responding to the user's operation on the object. In step S76, the acquisition unit 32 of the information processing apparatus 10 receives information for responding to the user's operation on the object from the cooperation apparatus 14.

In step S78, the virtual space control unit 40 of the information processing apparatus 10 determines whether selection by the user is to be performed on the basis of the information received from the cooperation apparatus 14. For example, in a case that the information received from the cooperation apparatus 14 is a list of files and the user is required to select a file, the virtual space control unit determines that the selection by the user is to be performed.

When the determination result indicates that the selection by the user is to be performed, in step S80, the virtual space control unit 40 controls the user terminal 12 to display an image for receiving the selection of information by the user on the basis of the information received from the cooperation apparatus 14, to receive selection of desired information by the user. By contrast, when the determination result indicates that no selection of information by the user is to be performed, the virtual space control unit 40 skips the process of step S80.

In step S82, the virtual space control unit 40 performs processing for responding to the user's operation on the object. When the selection of desired information by the user is performed, the virtual space control unit 40 performs processing for responding to the user's operation on the object on the basis of the information selected by the user. When no selection of desired information by the user is performed, the virtual space control unit 40 performs processing for responding to the user's operation on the object on the basis of the information received from the cooperation apparatus 14.

In the present embodiment, a specific example is described. For example, the user can perform a particular operation for using a function similar to a function of the IWB in the real space on the particular object 1100*a* representing the IWB in the second virtual space in FIG. 7. Examples of the particular operation include, but are not limited to, an operation of performing, in the second virtual space, a function of performing authentication by bringing an integrated circuit (IC) card close to or in contact with an IC card reader of the IWB in the real space and an operation of performing, in the second virtual space, a function of causing the IWB in the real space to cooperate with the online storage.

For example, the user of the user terminal 12 performs the particular operation on the particular object 1100*a* representing the IWB in the second virtual space illustrated in FIG. 7 to use a function similar to a function of the IWB in the real space through the similar process to that of operating the IWB in the real space.

Figure 15:
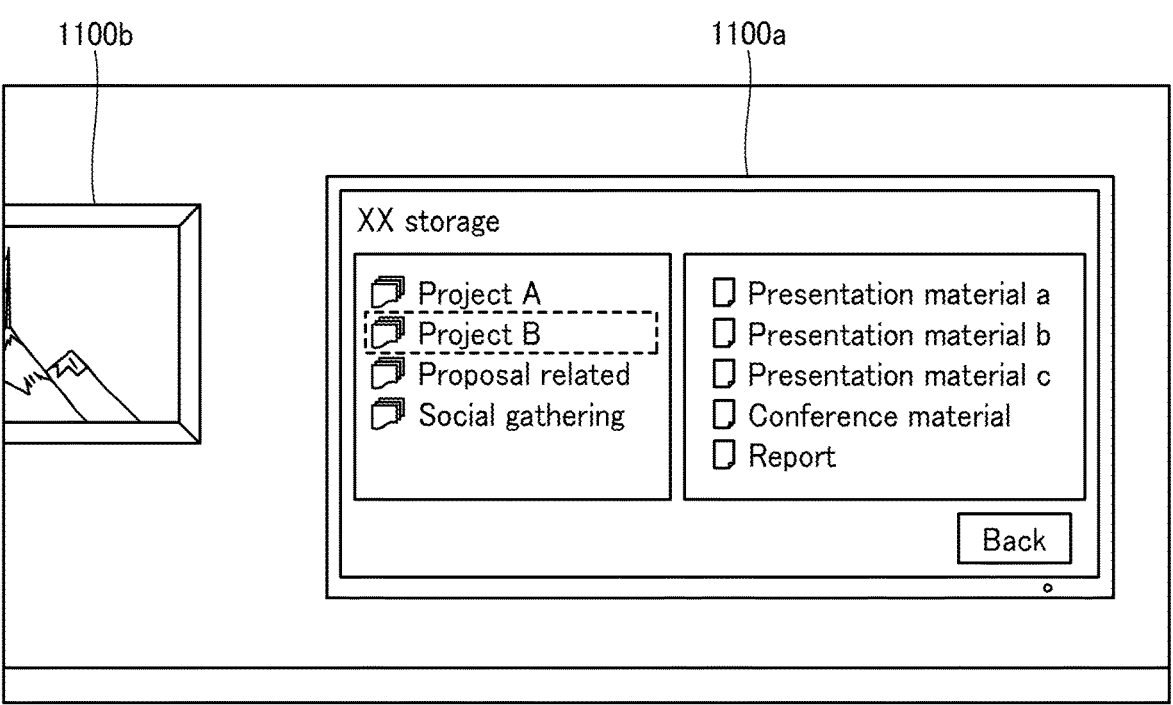
FIG. 15 is an illustration of an example of display output by an object in the second virtual space, according to an embodiment of the present disclosure.

The particular object 1100*a* representing the IWB in the second virtual space of FIG. 7 logs in to the online storage according to the particular operation received from the user and displays a list of files stored in the online storage as illustrated in FIG. 15, for example. FIG. 15 is an illustration of an example of display output by an object in the second virtual space. As illustrated in FIG. 15, the particular object 1100*a* representing the IWB in the second virtual space can display a list of files stored in the online storage, which is an example of the cooperation apparatus 14, according to the particular operation of the user.

Figure 16:
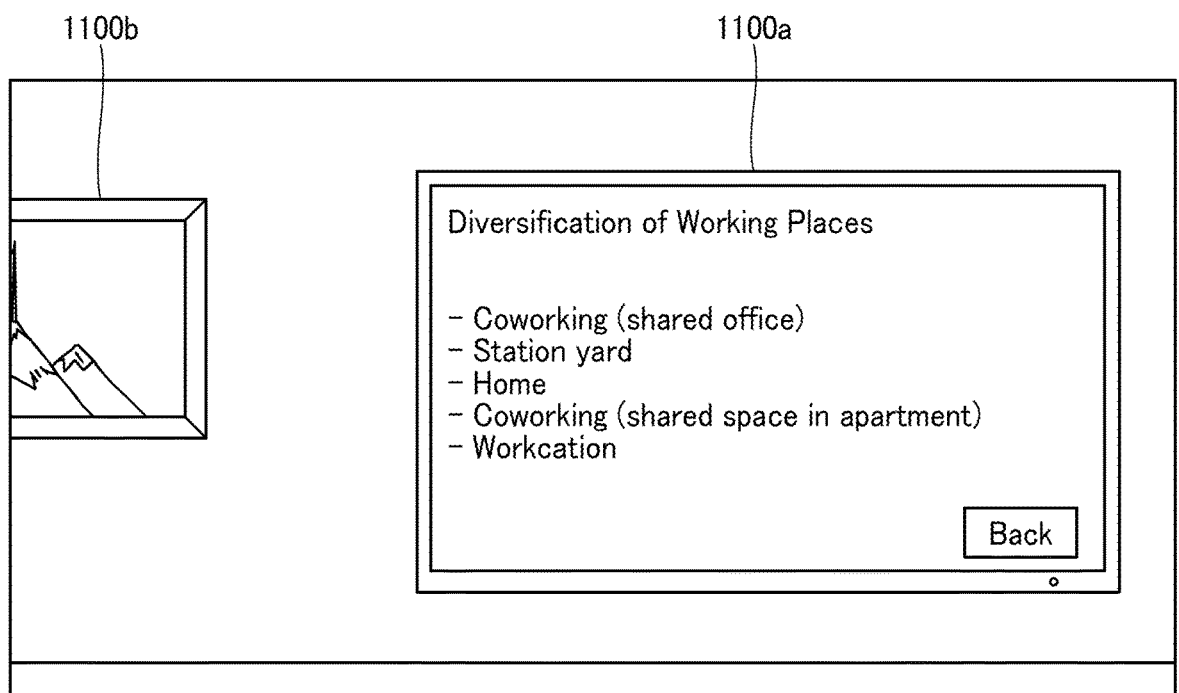
FIG. 16 is an illustration of an example of display output by an object in the second virtual space, according to an embodiment of the present disclosure.

Further, as illustrated in, for example, FIG. 16, the particular object 1100*a* representing the IWB in the second virtual space illustrated in FIG. 7 can display content of a file selected from the list of files illustrated in FIG. 15, according to the particular operation received from the user. FIG. 16 is an illustration of an example of display output by an object in the second virtual space. As illustrated in FIG. 16, the particular object 1100*a* representing the IWB in the second virtual space can display, for example, the content of the file stored in the online storage, which is an example of the cooperation apparatus 14, according to the particular operation of the user.

With the particular object 1100*a* representing the IWB in the second virtual space, a user can give presentations or share documents, for example, even in the virtual space. By synchronizing display of the particular object representing the IWB in the second virtual space with display of the IWB in the real space, the present embodiment is applicable to can also be used for personnel training, for example. Thus, according to the present embodiment, a virtual space suitable as a business place where one conducts business.

Figure 17:
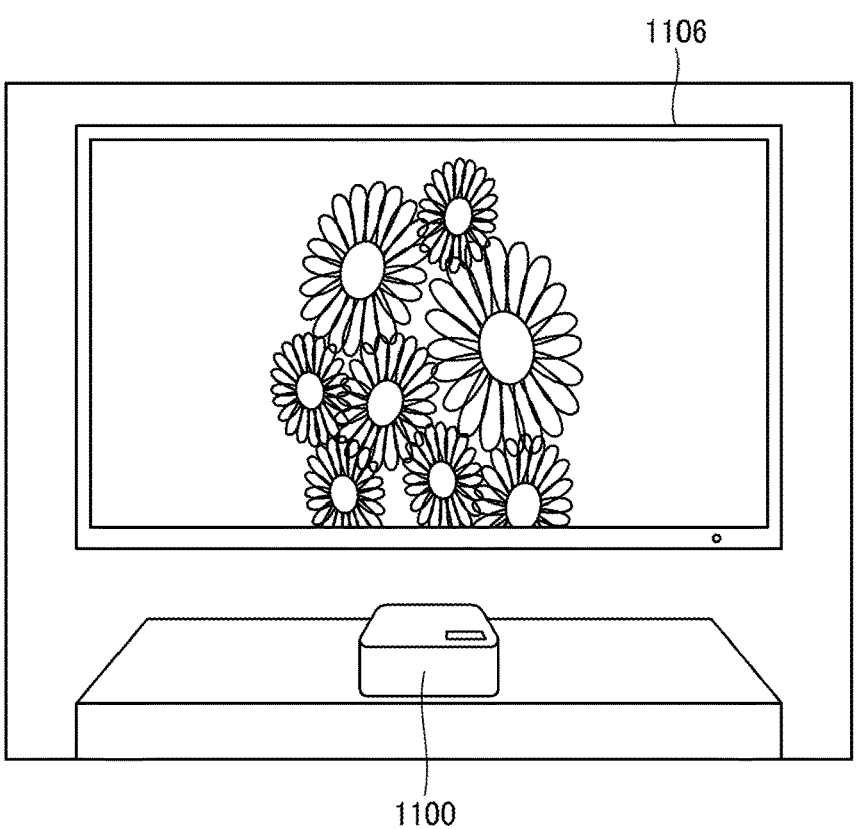
FIG. 17 is an illustration of an example of display output by an object in the second virtual space, according to an embodiment of the present disclosure.

Further, the particular object 1100 in the second virtual space may be an object representing a projector as illustrated in FIG. 17, for example. FIG. 17 is an illustration of an example of display output by an object in the second virtual space. As illustrated in FIG. 17, the particular object 1100 representing a projector in the second virtual space can display, for example, an image projected by a projector, which is an example of the cooperation apparatus 14, on an object 1106 representing a projection screen.

Figure 18:
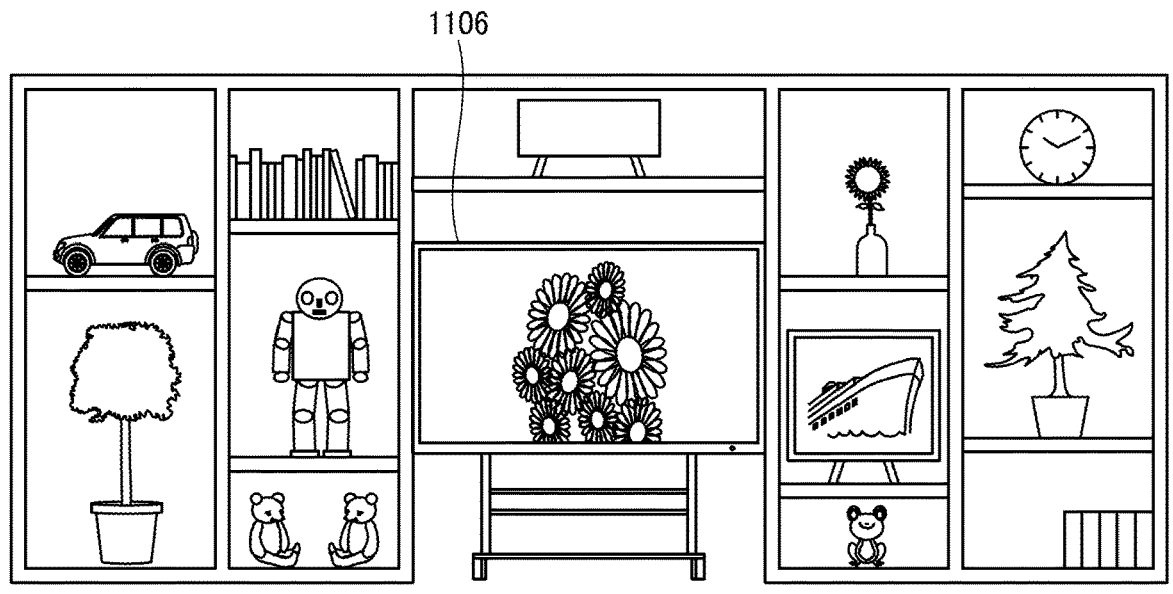
FIG. 18 is an illustration of an example of display output by an object in the second virtual space, according to an embodiment of the present disclosure.

Furthermore, as illustrated in FIG. 18, the particular object 1100 in the second virtual space may be an object 1106 representing a projection screen such as a projection mapping. FIG. 18 is an illustration of an example of display output by an object in the second virtual space. As illustrated in FIG. 18, the object 1106 in the second virtual space representing the projection screen such as a projection mapping can display an image of a projection mapping distributed by a set top box, which is an example of the cooperation apparatus 14, on the object 1106 representing the projection screen.

The virtual space according to the related art is not sufficient as a place where one carries out various tasks such as an actual meeting or customer service. According to the present embodiment, a virtual space is provided that is more adoptable to a place where a user performs work in the real space (a place where various tasks such as an actual meeting and customer service are performed).

Second Embodiment

In the second embodiment, the user terminal 12 display the second virtual space reflecting attribute information of a user. Since the second embodiment is substantially the same as the first embodiment in a part, the redundant description is omitted below.

In the second embodiment, the user information storage unit 50 of the storage unit 26 stores user information illustrated in FIG. 19, for example. FIG. 19 is a table of an example of a data structure of the user information. The user information of FIG. 19 includes items of user, connection destination virtual space, and attribute information. The item "user" and the item "connection destination virtual space" are the same or substantially the same as the user information of FIG. 4. The item "attribute information" is attribute information of a user. The user information of FIG. 19 includes, as an example of the attribute information of the user, height, gender, line-of-sight information, and preference. The line-of-sight information includes, for example, information indicating a reference position in a space and angle information such as an elevation angle.

In the second embodiment, the association information storage unit 52 of the storage unit 26 stores association information illustrated in FIG. 20, for example. FIG. 20 is a table of an example of a data structure of the association information. The association information of FIG. 20 includes items of first virtual space and corresponding second virtual space. The item "first virtual space" is an example of identification information of the first virtual space associated with a user of the user terminal 12. The item "corresponding second virtual space" is an example of identification information identifying the second virtual space that can be called from the virtual space identified by the item "first virtual space."

Figure 21:
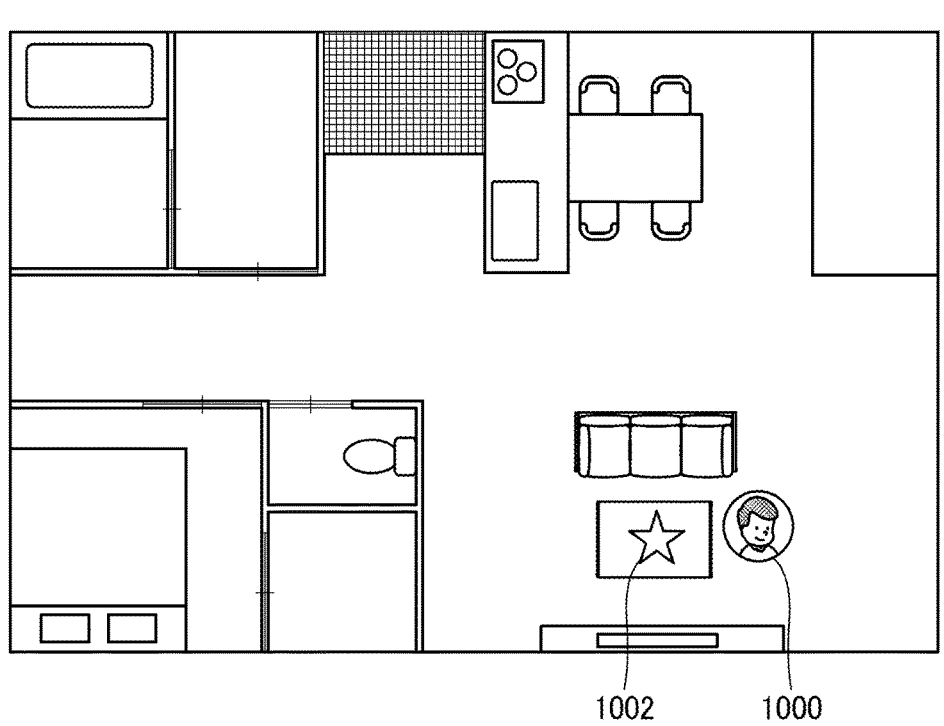
FIG. 21 is an illustration of an example of the first virtual space, according to an embodiment of the present disclosure.
Figure 22A:
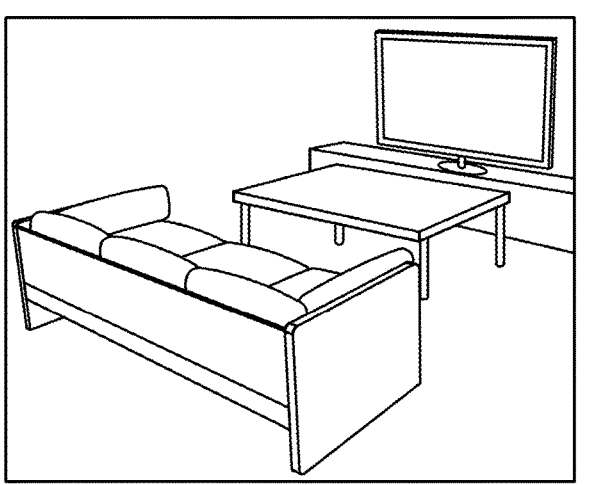
FIG. 22A and FIG. 22B are illustrations of examples of the second virtual space, according to an embodiment of the present disclosure.
Figure 22B:
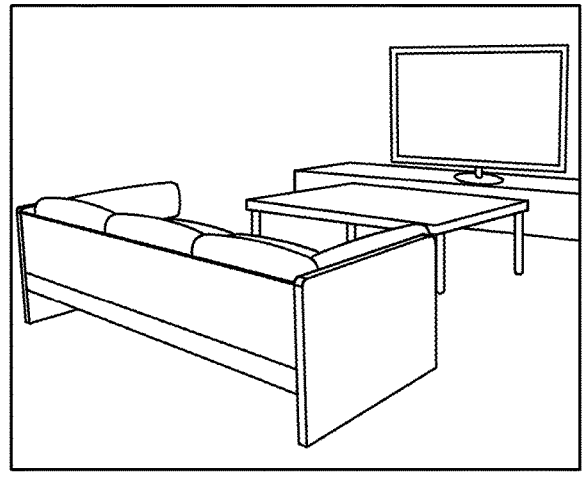

In the present embodiment, examples of the first virtual space as illustrated in FIG. 21 and the second virtual space as illustrated in FIG. 22A and FIG. 22B are described. FIG. 21 is an illustration of an example of the first virtual space. FIG. 22A and FIG. 22B are illustrations of examples of the second virtual space.

The first virtual space of FIG. 21 is an example of the first virtual space of a housing showroom. In this case, a user includes a sales person and a visitor. In the first virtual space, the icon 1000 representing a logged-in user, who is a user logging in, is displayed. The logged-in user can move the icon 1000 by operating the user terminal 12.

Further, in the substantially the same manner as first virtual space of FIG. 6, the first virtual space is provided with an entrance to the second virtual space for the logged-in user. In other words, the first virtual space includes a mechanism for calling the second virtual space. For example, in the first virtual space of FIG. 21, an object 1002 representing an example of an entrance to the second virtual space is displayed. The user operates the user terminal 12 to, for example, move the icon 1000 representing the user himself or herself close to the entrance to the second virtual space or to move the icon 1000 to cause the icon to overlap with the entrance to the second virtual space, to control the user terminal to display the second virtual space in which the attribute information of the user is reflected as illustrated in FIG. 22A and FIG. 22B. In a case that the first virtual space is a housing showroom, a visitor may be requested to register his or her attribute information in advance, for example, when making a reservation for the tour. Further, the attribute information of the visitor may be acquired from video captured by an installed camera.

FIG. 22A and FIG. 22B illustrate examples of the second virtual space in which the height is reflected from among the item "attribute information" of the user information of FIG. 19. FIG. 22A illustrates an example of the second virtual space viewed from a tall person. FIG. 22B illustrates an example of the second virtual space viewed from the a short person.

In a case that the second virtual space is a housing showroom, a visitor may have different impressions for the height of a ceiling, the width of a balcony, etc. depending on the height of the visitor. To address such an issue, according to the present embodiment, the second virtual spaces as illustrated in FIG. 22A and FIG. 22B are reproduced in which different views depending on the height of the visitor are reflected.

Figure 23:
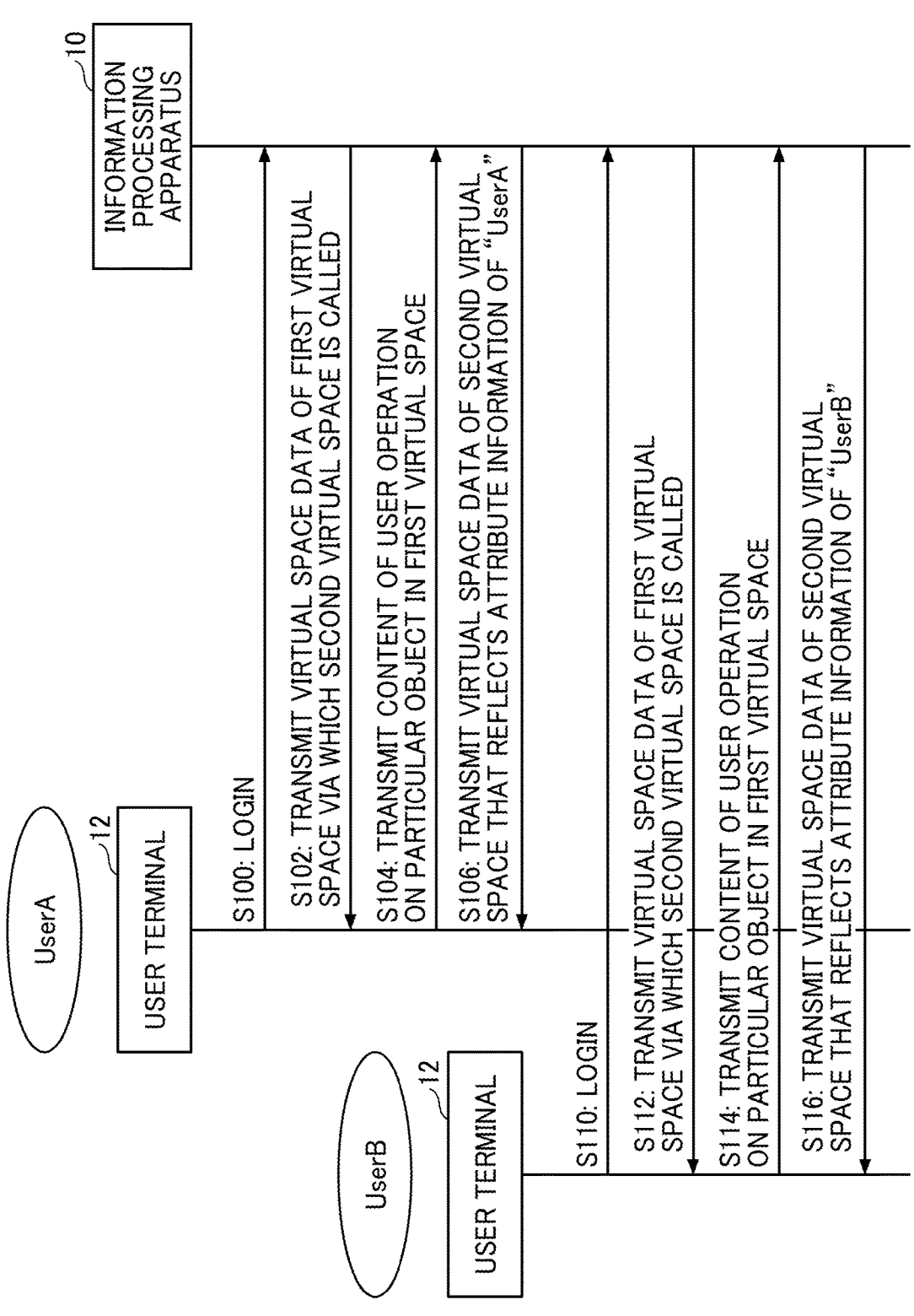
FIG. 23 is a sequence diagram illustrating an example of an operation of displaying a virtual space performed by the information processing system, according to an embodiment of the present disclosure.

FIG. 23 is a sequence diagram illustrating an example of an operation of displaying a virtual space by the information processing system 1, according to the present embodiment. In step S100, the user terminal 12 receives a login operation from the user "UserA." The communication unit 70 of the user terminal 12 transmits a login request of the user "UserA" to the information processing apparatus 10. The authentication unit 22 of the information processing apparatus 10 performs authentication processing of the user "UserA." When the authentication is successful, the virtual space control unit 40 of the processing unit 24 identifies the "virtual space A" as the connection destination virtual space corresponding to the user "UserA" on the basis of the user information of FIG. 19. In step S102, the transmission unit 30 of the information processing apparatus 10 transmits, to the user terminal 12 of the user "UserA", the identified connection destination virtual space "virtual space A" as virtual space data of the first virtual space from which the second virtual space can be called.

The display control unit 74 of the user terminal 12 of the user "UserA" that receives the virtual space data of the virtual space "virtual space A" displays the first virtual space as illustrated in FIG. 21. The user "UserA" operates the user terminal 12 to perform an operation such as moving the icon 1000 representing the user "UserA" closer to the entrance to the second virtual space such as the object 1002 or causing the icon overlap with the entrance to the second virtual space.

In step S104, the communication unit 70 of the user terminal 12 transmits content of the operation performed by the user "UserA" on the particular object 1002 in the first virtual space to the information processing apparatus 10. The acquisition unit 32 of the information processing apparatus 10 receives the content of the operation performed by the user "UserA" on the particular object 1002 in the first virtual space.

The object control unit 42 of the processing unit 24 identifies the second virtual space "virtual space A'" corresponding to the first virtual space "virtual space A" of the user "UserA" on the basis of the association information of FIG. 20. The virtual space control unit 40 acquires the attribute information such as the height and the line-of-sight information relating to the view by the user "UserA" from the user information of FIG. 19, for example. The virtual space control unit 40 updates the identified second virtual space "virtual space A'" of the user "UserA" to reflect the acquired attribute information. Since the user "UserA" is an example of a tall user, the second virtual space "virtual space A'" reflecting the attribute information is as illustrated in FIG. 22A.

In step S106, the transmission unit 30 of the information processing apparatus 10 transmits virtual space data of the second virtual space "virtual space A'" reflecting the attribute information of the user "UserA" to the user terminal 12 of the user "UserA." Thus, the display control unit 74 of the user terminal 12 of the user "UserA" can display the second virtual space "virtual space A'" of FIG. 22A in which the attribute information of the user "UserA" is reflected.

In step S110, the user terminal 12 receives a login operation from a user "UserB". The communication unit 70 of the user terminal 12 transmits a login request of the user "UserB" to the information processing apparatus 10. The authentication unit 22 of the information processing apparatus 10 performs authentication processing of the user "UserB." When the authentication is successful, the virtual space control unit 40 of the processing unit 24 identifies the "virtual space A" as the connection destination virtual space corresponding to the user "UserB" on the basis of the user information of FIG. 19. In step S112, the transmission unit 30 of the information processing apparatus 10 transmits, to the user terminal 12 of the user "UserB", the identified connection destination virtual space "virtual space A" as virtual space data of the first virtual space from which the second virtual space can be called.

The display control unit 74 of the user terminal 12 of the user "UserB" that receives the virtual space data of the virtual space "virtual space A" displays the first virtual space as illustrated in FIG. 21. The user "UserB" operates the user terminal 12 to perform an operation such as moving the icon 1000 representing the user "UserB" closer to the entrance to the second virtual space such as the object 1002 or causing the icon overlap with the entrance to the second virtual space.

In step S114, the communication unit 70 of the user terminal 12 transmits content of the operation performed by the user "UserB" on the particular object 1002 in the first virtual space to the information processing apparatus 10. The acquisition unit 32 of the information processing apparatus 10 receives the content of the operation performed by the user "UserB" on the particular object 1002 in the first virtual space.

The object control unit 42 of the processing unit 24 identifies the second virtual space "virtual space A'" corresponding to the first virtual space "virtual space A" of the user "UserB" on the basis of the association information of FIG. 20. The virtual space control unit 40 acquires the attribute information such as the height and the line-of-sight information relating to the view by the user "UserB" from the user information of FIG. 19, for example. The virtual space control unit 40 updates the identified second virtual space "virtual space A'" of the user "UserA" to reflect the acquired attribute information. Since the user "UserB" is an example of a short user, the second virtual space "virtual space A'" reflecting the attribute information is as illustrated in FIG. 22B.

In step S116, the transmission unit 30 of the information processing apparatus 10 transmits virtual space data of the second virtual space "virtual space A'" reflecting the attribute information of the user "UserB" to the user terminal 12 of the user "UserB." Thus, the display control unit 74 of the user terminal 12 of the user "UserA" can display the second virtual space "virtual space A'" of FIG. 22B in which the attribute information of the user "UserB" is reflected.

According to the present embodiment, a virtual space is provided that is more suitable to business that is performed at a customer service site such as a housing showroom where a sales person serves a visitor, since in such business it is desirable to provide a more realistic experience for a visitor, such as difference in views depending on the arrangement of furniture and the height of a kitchen table.

Third Embodiment

In the third embodiment, a user who can call a second virtual space from a first virtual space is selected by providing the particular object 1002 in the first virtual space with an object operation authority. Since the third embodiment is substantially the same as the first embodiment and the second embodiment in a part, the redundant description is omitted below.

In the third embodiment, the user information storage unit 50 of the storage unit 26 stores user information illustrated in FIG. 24, for example. FIG. 24 is a table of an example of a data structure of the user information. The user information of FIG. 24 includes items of user, connection destination virtual space, and attribute information. The user information of FIG. 24 differs from the user information of FIG. 19 in that the attribute information includes authority. The authority included in the item "attribute information" indicates authority such as employee or visitor of a user identified by the item "user."

In the third embodiment, the object information storage unit 60 of the storage unit 26 stores object information as illustrated in FIG. 25, for example. FIG. 25 is a table of an example of a data structure of the object information. The object information in FIG. 25 includes items of first virtual space, arranged object, event to be executed when object is operated, and object operation authority.

The item "first virtual space" is an example of identification information identifying the first virtual space. The item "arranged object" is an example of identification information identifying the object 1002 arranged in a virtual space identified by the item "first virtual space." In the item "event to be executed when object is operated," an event to be executed when an operation by a user having authority with respect to the object 1002 identified by the item "arranged object" in the first virtual space is received is set. The item "object operation authority" indicates authority assigned to a user who can operate the object 1002 identified by the item "arranged object" in the first virtual space.

For example, "free" in the object operation authority indicates that a user having any authority can operate the object 1002 in the first virtual space. Further, for example, "employee" in the object operation authority indicates that a user having authority of "employee" can operate the object 1002 in the first virtual space. According to the user information of FIG. 24 and the object information in FIG. 25, for example, the object 1002 in the first virtual space that can be operated by anyone and the object 1002 in the first virtual space that can be operated only by an employee can be arranged in the first virtual space.

Figure 26:
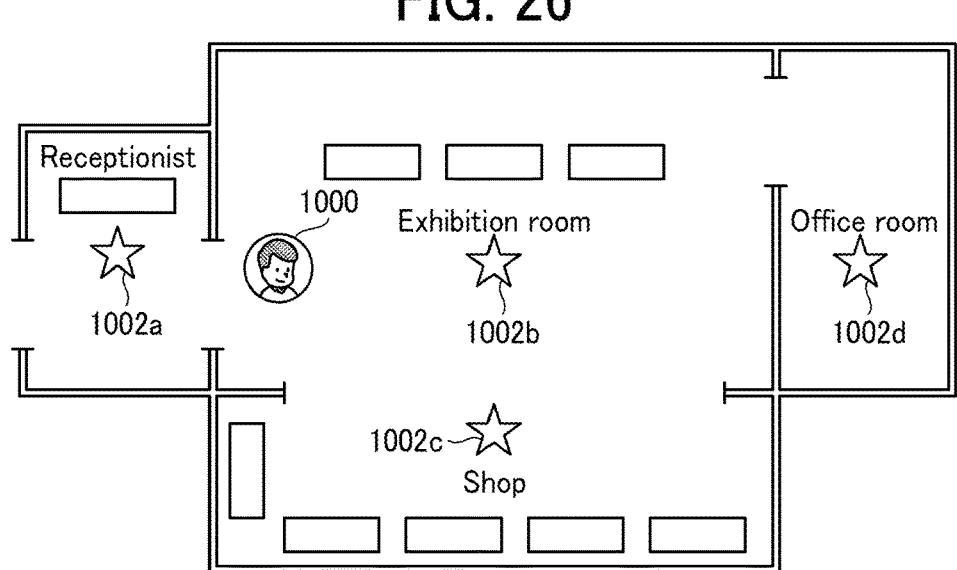
FIG. 26 is an image diagram of an example of a first virtual space, according to an embodiment of the present disclosure.
Figure 27A:
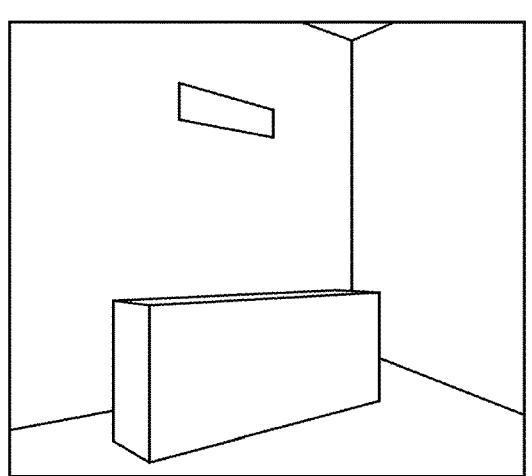
FIG. 27A to FIG. 27D are illustrations of examples of a second virtual space, according to an embodiment of the present disclosure.
Figure 27B:
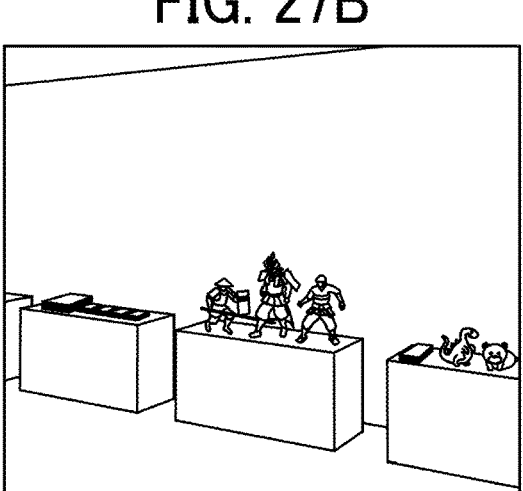

In the present embodiment, examples of the first virtual space as illustrated in FIG. 26 and the second virtual space as illustrated in FIG. 27A and FIG. 27B are described. FIG. 26 is an illustration of an example of the first virtual space. FIG. 27A to FIG. 27D are illustrations of examples of the second virtual space.

The first virtual space illustrated in FIG. 26 is an example of the first virtual space for art and science purposes, such as a tour in which a visitor is accompanied with a tour guide in an art gallery, a museum, or the like. In this case, a user includes the tour guide and the visitor. In the first virtual space, the icon 1000 representing a logged-in user, who is a user logging in, is displayed. The logged-in user can move the icon 1000 by operating the user terminal 12.

The first virtual space is provided with an entrance to the second virtual space for the user having authority. In other words, the first virtual space includes a mechanism for calling the second virtual space. For example, in the first virtual space of FIG. 26, the object 1002a to an object 1002d each representing an example of the entrance to the second virtual space are displayed. The object operation authority is set for each of the object 1002a to the object 1002d as illustrated in the object information of FIG. 25.

With this configuration, the user having authority operates the user terminal 12 to, for example, move the icon 1000 representing the user himself or herself close to the entrance to the second virtual space or to move the icon 1000 to cause the icon to overlap with the entrance to the second virtual space, to control the user terminal to display the second virtual space in which the attribute information of the user is reflected as illustrated in FIG. 27A to FIG. 27D. By contrast, when the user to whom no authority is assigned operates the user terminal 12 to, for example, move the icon 1000 representing the user himself or herself close to the entrance to the second virtual space or to move the icon 1000 to cause the icon to overlap with the entrance to the second virtual space, the user terminal does not display the second virtual space as illustrated in FIG. 27A to FIG. 27D, for example.

For example, in the example of the object information in FIG. 25, an arranged object D is set to the particular object 1002d of "office room" in the first virtual space in FIG. 26. This prohibits the visitor from operating the object 1002d to call the second virtual space of the office. The employees can call the second virtual space of the office by operating the object 1002d.

FIG. 27A to FIG. 27D illustrate examples of the second virtual space called from the first virtual space illustrated in FIG. 26. In the example of the object information of FIG. 25, the arranged object A is set to the particular object 1002a of "receptionist" in the first virtual space of FIG. 26. The arranged object B is set to the particular object 1002b of "exhibition room" in the first virtual space of FIG. 26. The arranged object C is set to the particular object 1002c of "shop" in the first virtual space of FIG. 26. In the example of the object information of FIG. 25, the arranged object D is set to the particular object 1002d of "office room" in the first virtual space of FIG. 26.

FIG. 27A illustrates an example of the second virtual space of a receptionist called by operating the particular object 1002a of the "receptionist" in the first virtual space of FIG. 26. FIG. 27B illustrates an example of the second virtual space of a shop called by operating the particular object 1002c of the "shop" in the first virtual space of FIG. 26.

Figure 27C:
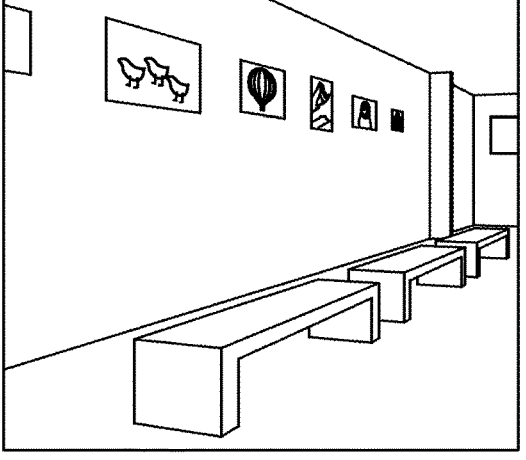
Figure 27D:
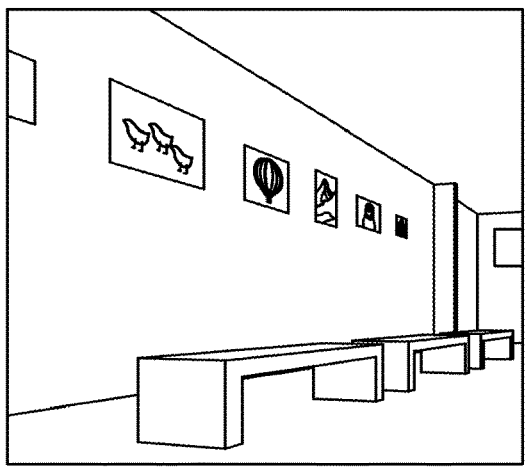

FIG. 27C illustrates an example of the second virtual space of an exhibition room reflecting the attribute information of a user who is tall, the second virtual space being called by operating the particular object 1002b of the "exhibition room" in the first virtual space of FIG. 26. FIG. 27D illustrates an example of the second virtual space of an exhibition room reflecting the attribute information of a user who is short, the second virtual space being called by operating the particular object 1002b of the "exhibition room" in the first virtual space of FIG. 26.

Figure 28:
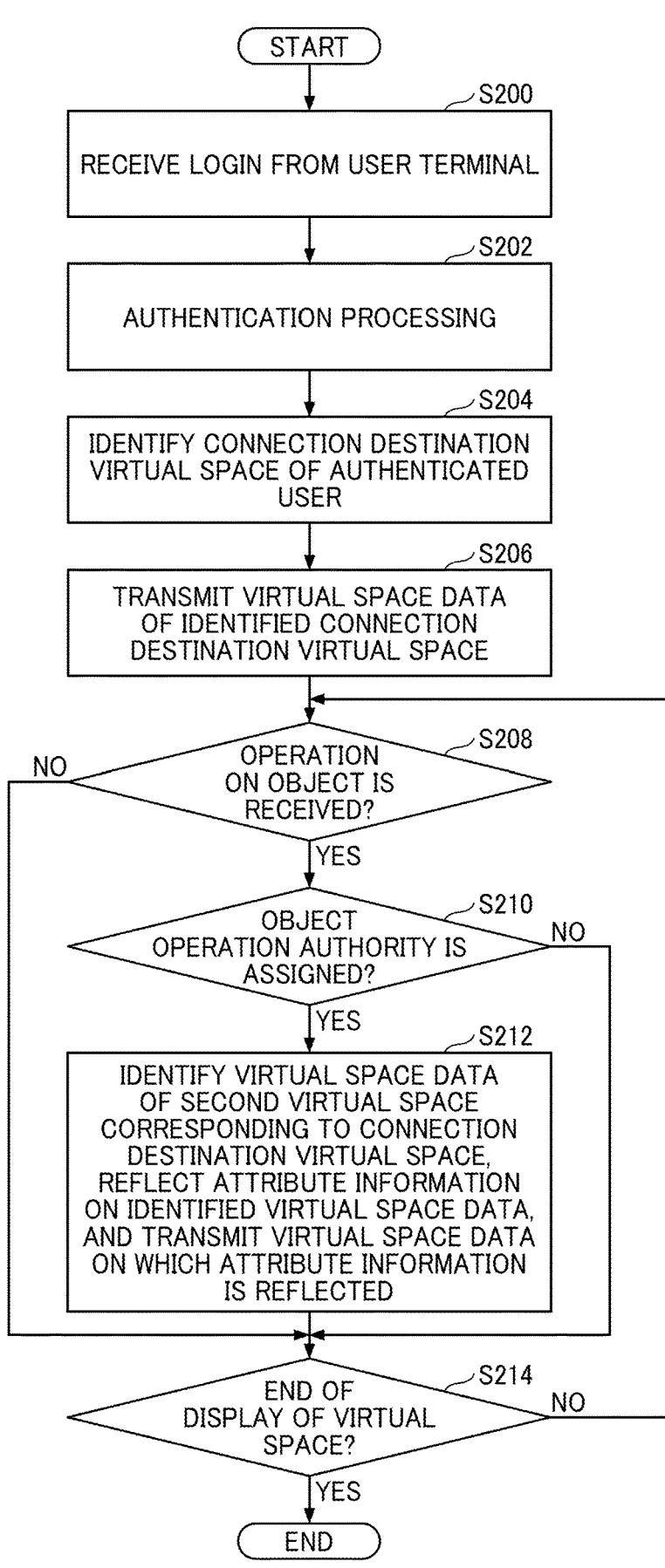
FIG. 28 is a flowchart illustrating an example of an operation of displaying a virtual space performed by the information processing apparatus, according to an embodiment of the present disclosure.

FIG. 28 is a flowchart illustrating an example of an operation of displaying a virtual space performed by the information processing apparatus 10, according to the present embodiment.

In step S200, the acquisition unit 32 of the information processing apparatus 10 receives a login request according to a user operation from the user terminal 12. In step S202, the authentication unit 22 performs authentication processing of authenticating the user operating the user terminal 12 from which the login request is received. When the authentication is successful, in step S204, the virtual space control unit 40 of the processing unit 24 identifies the connection destination virtual space of the authenticated user on the basis of the user information of FIG. 24.

In step S206, the transmission unit 30 of the information processing apparatus 10 transmits virtual space data of the identified connection destination virtual space to the user terminal 12 of the user for who is successfully authenticated. In step S208, the object control unit 42 determines whether content of the operation on the object 1002 in the connection destination virtual space is received from the user terminal 12.

When the determination result indicates that the content of the operation on the object 1002 in the connection destination virtual space is received from the user terminal 12, the object control unit 42 performs a process of step S210. The object control unit 42 refers to the authority included in the attribute information of the user information of, for example, FIG. 24 and the object operation authority in the object information of FIG. 25. The object control unit 42 determines whether the user has object operation authority on the basis of the authority included in the attribute information of the user information of, for example, FIG. 24 and the object operation authority in the object information of FIG. 25.

When the determination result indicates that the user has the object operation authority, the virtual space control unit 40 performs a process of step S212. In step S212, when the object 1002 on which the operation by the user is received is the object 1002 that calls the second virtual space, the virtual space control unit 40 identifies virtual space data of the second virtual space corresponding to the connection destination virtual space. The virtual space control unit 40 reflects the attribute information of the user in the identified virtual space data of the second virtual space. The virtual space control unit 40 transmits the virtual space data of the second virtual space in which the attribute information is reflected to the user terminals 12 of the user. Then, the operation proceeds to a process of step S214.

By contrast, when the determination result in step S208 indicates that the content of the operation on the object 1002 in the connection destination virtual space is not received from the user terminal 12, and when the determination result in step S210 indicates that the user has no object operation authority, the virtual space control unit 40 proceeds to a process of step S214.

In step S214, the virtual space control unit 40 determines whether content of an operation for ending display of the virtual space is received from the user terminal 12. The information processing apparatus 10 repeats the processes of steps S208 to S214 until the content of the operation for ending the display of the virtual space is received from the user terminal 12.

With the operation of the flowchart of FIG. 28, when an operation on the object 1002 that calls the second virtual space is received from the user who has the object operation authority, the user terminal 12 can be controlled to display the second virtual space of, for example, FIG. 27. With the operation of the flowchart of FIG. 28, when an operation on the object 1002 that calls the second virtual space is received from the user who has no object operation authority, the user terminal 12 can be controlled to avoid displaying the second virtual space of, for example, FIG. 27.

Other Embodiment

Figures 29, 30:
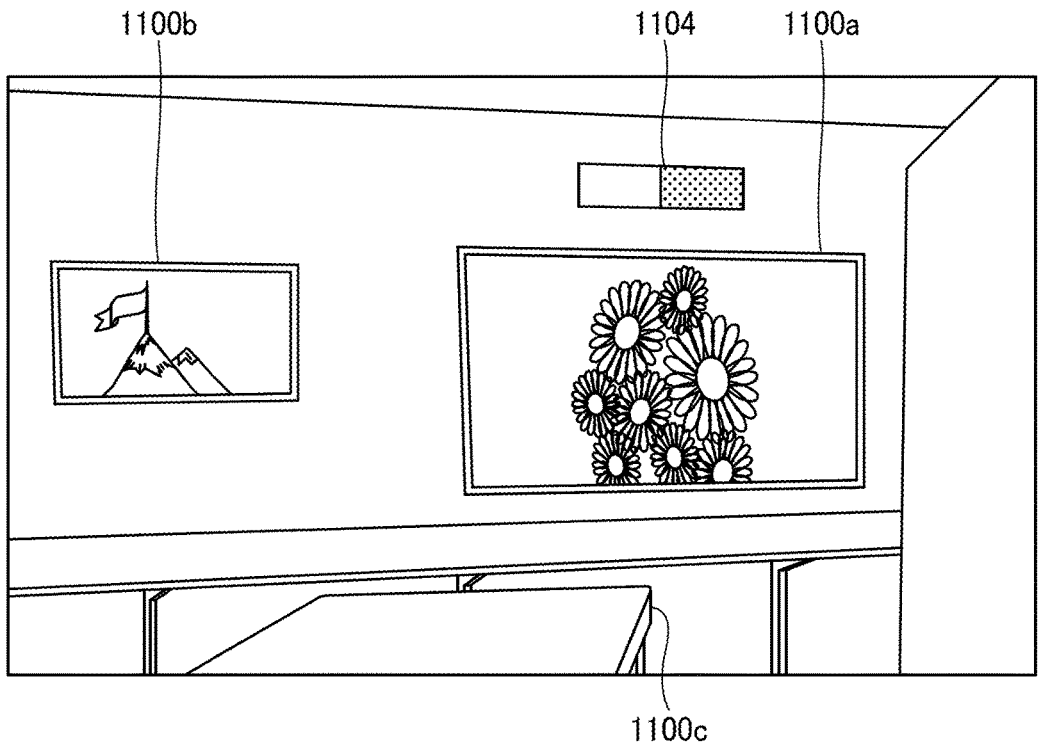
FIG. 29 is a table of an example of a data structure of cooperation destination information, according to an embodiment of the present disclosure.
FIG. 30 is an illustration for describing an example of switching of object operation authority, according to an embodiment of the present disclosure.

As another example of the present embodiment, the above-described information processing system 1 may register in advance object operation authority for the particular object 1100 that receives an operation by a user in the second virtual space, as cooperation destination information of FIG. 29, for example. FIG. 29 is a table of an example of a data structure of the cooperation destination information.

The cooperation destination information of FIG. 29 includes items of second virtual space, object, cooperation destination information, and object operation authority. The cooperation destination information of FIG. 29 includes the item "object operation authority" in addition to the items in the cooperation destination information of FIG. 10. The item "object operation authority" indicates authority of a user who has operation authority for the particular object 1100 identified by the item "object."

For example, when "administrator" is set in the item "object operation authority," the particular object 1100 identified by the item "object" can be operated by a user whose authority is "administrator." The item "object management authority" of the cooperation destination information may be provided with an object operation authority switching button 1104 as in the second virtual space illustrated in FIG. 30, for example.

FIG. 30 is an illustration for describing an example of switching of the object operation authority. For example, the object operation authority switching button 1104 receives switching between a state in which a user whose authority is "administrator" has the object operation authority for the particular object 1100a and a state in which a user whose authority is authority other than "administrator" has the object operation authority for the particular object 1100a.

The description provided above is of an example in which the information processing system 1 calls the second virtual space from the first virtual space. In another example of the present embodiment, the second virtual space may be set as the connection destination virtual space in association with the user identified by the item "user." By setting the second virtual space as the connection destination virtual space in association with the user identified by the item "user," the information processing system 1 according to the present embodiment can display the second virtual space set as the connection destination virtual space of the user without displaying the first virtual space on the user terminal 12 of the user who is successfully authenticated. The authority "administrator" for the particular object 1002d of "office room" in the virtual space described in the present embodiment can also be applied to the "employee" authority (e.g., by department or by employee position) in a case where permission is provided for each of "departments" partitioned in an office space as described in the first embodiment, or authority "sales person" assigned to a "back office" partitioned from the house exhibition space of the housing showroom described in the second embodiment.

In a customer service, one may sometimes first communicate information in a non face-to-face manner and thereafter meet a visitor in person. In this case, the one often receives a comment from the visitor that the visitor has a different impression from what they heard and saw in the non face-to-face manner.

In view of such an issue, the virtual space according to the related art is not sufficient as a place where one carries out various tasks such as an actual meeting or customer service.

A virtual space according to the related art is not sufficient as a place where one carries out various tasks such as actual meetings and customer service (a business place where one actually carries out tasks).

According to one or more embodiments of the present disclosure, a virtual space is provided that is more suitable for works performed by a user in a real space.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in the above-described embodiments are merely one example of the plural computing environments that implement the embodiments disclosed herein. The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing apparatus communicable with a user terminal operated by a user, and a cooperation apparatus including a first memory, the information processing apparatus comprising:

a second memory configured to store user identification information for a plurality of users in association with virtual space identification information for a plurality of virtual spaces, respectively; and circuity configured to:

perform an authentication process to authenticate the user in response to receiving a request from the user terminal operated by the user;

in response to authenticating the user, identify the virtual space identification information associated with the user identification information for the authenticated user by referencing the second memory;

transmit, to the user terminal operated by the user authenticated, virtual space data according to which the user terminal displays a virtual space corresponding to the identified virtual space identification information, the virtual space being configured to display a virtual screen representing a display device;

acquire, according to a user operation of the virtual screen in the virtual space, data stored in the first memory of the cooperation apparatus, the user operation of the virtual screen including an operation to select a file to be displayed on the virtual screen among a list of a plurality of files stored in the first memory of the cooperation apparatus; and cause the user terminal to display the data acquired from the first memory of the cooperation apparatus on the virtual screen displayed in the virtual space, the data acquired from the first memory of the cooperation apparatus being content of the file selected to be displayed on the virtual screen.

2. The information processing apparatus of claim 1, wherein the cooperation apparatus is located in a real space and is communicable with the information processing apparatus through a network.

3. The information processing apparatus of claim 1, wherein the circuitry displays the data stored in the first memory of the cooperation apparatus on the virtual screen displayed in the virtual space and on a device in a real space corresponding to the virtual screen synchronously with each other.

4. The information processing apparatus of claim 1, wherein the circuitry receives switching of authority of the user who is permitted to operate the virtual screen in the virtual space according to an operation by the user with respect to the virtual space.

5. The information processing apparatus of claim 1, wherein the user terminal includes terminal circuitry configured to change a view of the virtual space based on attribute information of the user.

6. The information processing apparatus of claim 1, wherein the user terminal includes terminal circuitry to display a screen that allows the user to select information for responding to the operation on the virtual screen from one or more pieces of information accessible by the user stored in the first memory of the cooperation apparatus.

7. The information processing apparatus of claim 1, wherein the cooperation apparatus is at least one of a personal computer, a camera, a multifunction peripheral/product/printer, an interactive whiteboard, a projector, a content management apparatus, or an online storage.

8. The information processing apparatus of claim 1, wherein the virtual space is one of a moving image and a still image, each being expressed in three dimensions.

9. The information processing apparatus of claim 8, wherein the virtual space is one of a 360-degree moving image and a 360-degree still image, each being expressed in three dimensions.

10. The information processing apparatus of claim 1, wherein the cooperation apparatus is an online storage, and the circuitry is further configured to acquire information of files stored in the online storage from the online storage; and display the information of the files acquired from the online storage on the virtual screen representing the display device.

11. The information processing apparatus of claim 1, wherein the circuitry is further configured to transmit, to the user terminal, second virtual space data according to which the user terminal displays a second virtual space, the second virtual space configured to display an icon representing each of the plurality of users while the each of the plurality of users logs in.

12. An information processing system, comprising:

an information processing apparatus;

a user terminal operated by a user and communicable with the information processing apparatus; and a cooperation apparatus including a first memory, the information processing apparatus including a second memory configured to store user identification information for a plurality of users in association with virtual space identification information for a plurality of virtual spaces, respectively, and circuitry configured to perform an authentication process to authenticate the user in response to receiving a request from the user terminal operated by the user, in response to authenticating the user, identify the virtual space identification information associated with the user identification information for the authenticated user by referencing the second memory, transmit, to the user terminal operated by the user authenticated, virtual space data according to which the user terminal displays a virtual space corresponding to the identified virtual space identification information, the virtual space being configured to display a virtual screen representing a display device, acquire, according to a user operation of the virtual screen in the virtual space, data stored in the first memory of the cooperation apparatus, the user operation of the virtual screen including an operation to select a file to be displayed on the virtual screen among a list of a plurality of files stored in the first memory of the cooperation apparatus, and cause the user terminal to display the data acquired from the first memory of the cooperation apparatus on the virtual screen displayed in the virtual space, the data acquired from the first memory of the cooperation apparatus being content of the file selected to be displayed on the virtual screen, the user terminal including terminal circuitry configured to display, within the virtual space, the data acquired from the first memory of the cooperation apparatus based on the virtual space data received from the information processing apparatus, and receive the user operation performed in the virtual space.

13. The information processing system of claim 12, wherein the terminal circuitry of the user terminal changes a view of the virtual space based on attribute information of the user.

14. The information processing system of claim 12, wherein the terminal circuitry of the user terminal displays a screen that allows the user to select information for responding to the operation on the virtual screen from one or more pieces of information accessible by the user stored in the first memory of the cooperation apparatus.

15. The information processing system of claim 12, wherein the cooperation apparatus is located in a real space and is communicable with the information processing apparatus through a network.

16. An information processing method performed by an information processing apparatus communicable with a user terminal operated by a user and a cooperation apparatus including a first memory, the method comprising:

storing, in a second memory of the information processing apparatus, user identification information for a plurality of users in association with virtual space identification information for a plurality of virtual spaces, respectively;

performing an authentication process to authenticate the user in response to receiving a request from the user terminal operated by the user;

in response to authenticating the user, identifying the virtual space identification information associated with the user identification information for the authenticated user by referencing the second memory;

transmitting, to the user terminal operated by the user authenticated, virtual space data according to which the user terminal displays a virtual space corresponding to the identified virtual space identification information, the virtual space being configured to display a virtual screen representing a display device;

acquiring, according to a user operation of the virtual screen in the virtual space, data stored in the first memory of the cooperation apparatus, the user operation of the virtual screen including an operation to select a file to be displayed on the virtual screen among a list of a plurality of files stored in the first memory of the cooperation apparatus; and causing the user terminal to display the data acquired from the first memory of the cooperation apparatus on the virtual screen displayed in the virtual space, the data acquired from the first memory of the cooperation apparatus being content of the file selected to be displayed on the virtual screen.

* * * * *